US007445318B2

(12) United States Patent
Murata

(10) Patent No.: US 7,445,318 B2
(45) Date of Patent: Nov. 4, 2008

(54) METHOD OF MANUFACTURING LIQUID DROPLET EJECTION HEAD, LIQUID DROPLET EJECTION HEAD, AND LIQUID DROPLET EJECTION APPARATUS

(75) Inventor: Michiaki Murata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 510 days.

(21) Appl. No.: 11/130,996

(22) Filed: May 17, 2005

(65) Prior Publication Data

US 2005/0275695 A1 Dec. 15, 2005

(30) Foreign Application Priority Data

Jun. 11, 2004 (JP) ............................. 2004-174167
Mar. 14, 2005 (JP) ............................. 2005-072066

(51) Int. Cl.
*B41J 2/045* (2006.01)
*H04R 17/00* (2006.01)
*B23P 17/00* (2006.01)

(52) U.S. Cl. ........................ 347/70; 29/25.35; 29/890.1

(58) Field of Classification Search ............. 347/70-72; 29/890.01

See application file for complete search history.

(56) References Cited

U.S. PATENT DOCUMENTS 5,872,583 A * 2/1999 Yamamoto et al. ............ 347/70
6,491,384 B2 * 12/2002 Usui et al. .................... 347/70
2002/0189099 A1 * 12/2002 Nishikawa ................. 29/890.1

FOREIGN PATENT DOCUMENTS

| | | |
|---|---|---|
| JP | 02-301445 | 12/1990 |
| JP | 09-323414 | 12/1997 |
| JP | 2940544 | 8/1999 |
| JP | 2001-232793 | 8/2001 |

* cited by examiner

*Primary Examiner*—Matthew Luu
*Assistant Examiner*—Lisa M Solomon
(74) *Attorney, Agent, or Firm*—Fildes & Outland, P.C.

(57) ABSTRACT

A method of manufacturing a liquid droplet ejection head including nozzles that eject liquid droplets, pressure chambers that are communicated with the nozzles and filled with a liquid, a diaphragm that configures part of the pressure chambers, a pool chamber that pools the liquid supplied to the pressure chambers via flow paths, and piezoelectric elements that cause the diaphragm to be displaced, the method including: disposing the diaphragm on a support substrate; disposing the piezoelectric elements on the diaphragm; disposing a top plate including wirings on the diaphragm; and removing the support substrate from the diaphragm to form a piezoelectric element substrate and joining a flow path substrate, in which the pressure chambers are formed, to the piezoelectric element substrate.

17 Claims, 23 Drawing Sheets

METHOD OF MANUFACTURING LIQUID DROPLET EJECTION HEAD, LIQUID DROPLET EJECTION HEAD, AND LIQUID DROPLET EJECTION APPARATUS

CROSS-REFERENCE TO RELATED APPLICATION

This application claims priority under 35 USC 119 from Japanese Patent Applications Nos. 2004-174167 and 2005-72066, the disclosures of which are incorporated by reference herein.

BACKGROUND OF THE INVENTION

1. Field of the Invention

The present invention relates to a method of manufacturing a liquid droplet ejection head including nozzles that ejects droplets of a liquid such as ink, pressure chambers that are communicated with the nozzles and filled with a liquid such as ink, a diaphragm that configures part of the pressure chambers, a pool chamber that pools the liquid supplied to the pressure chambers via flow paths, and piezoelectric elements that cause the diaphragms to be displaced. The present invention also relates to a liquid droplet ejection head manufactured by this method and to a liquid droplet ejection apparatus disposed with this liquid droplet ejection head.

2. Description of the Related Art

Conventionally, an inkjet recording apparatus (liquid droplet ejection apparatus) has been known which prints an image (including characters) and the like on a recording medium such as recording paper by selectively ejecting ink droplets from plural nozzles of an inkjet recording head (sometimes referred to below simply as a "recording head") serving as an example of a liquid droplet ejection head. In this inkjet recording apparatus, the recording head is of a piezoelectric type or a thermal type.

For example, in the case of the piezoelectric format, as shown in FIGS. 15 and 16, a piezoelectric element (an actuator that converts electrical energy into mechanical energy) 206 is disposed on a pressure chamber 204, and ink 200 is supplied to the pressure chamber 204 from an ink tank via an ink pool chamber 202. The piezoelectric element 206 is elastically and concavely deformed so as to reduce the volume of the pressure chamber 204, pressurize the ink 200 in the pressure chamber 204, and cause the ink 200 to be ejected as an ink droplet 200A from a nozzle 208 that is communicated with the pressure chamber 204.

With respect to an inkjet recording head with this configuration, in recent years there has been the demand to make the inkjet recording head capable of high-resolution printing while keeping the inkjet recording head inexpensive and compact. In order to meet this demand, it becomes necessary to dispose the nozzles in a high density. However, with current recording heads, there has been a limit on disposing the nozzles 208 in a high density because the ink pool chamber 202 is disposed adjacent to the nozzles 208 (in between the nozzles 208), as shown in the drawings.

Also, drive ICs that apply a voltage to predetermined piezoelectric elements are disposed in the inkjet recording head. Conventionally, as shown in FIG. 17, the drive ICs have been mounted with a flexible printed circuit (FPC) 210. In other words, the drive ICs have been connected to the surfaces of metal electrodes on the surfaces of the piezoelectric elements 206 disposed on a diaphragm 214 by joining bumps 212 formed on the FPC 210 to the surfaces of the metal electrodes. Because the drive ICs (not shown) are mounted on the FPC 210, the drive ICs become electrically connected to the piezoelectric elements 206 at this stage.

There is also a method where electrode terminals on a mounting substrate on which the drive ICs are mounted are connected to electrode terminals disposed on the outer surface of the recording head by wire bonding (e.g., see Japanese Patent Application Laid-Open (JP-A) No. 2-301445). And there is a format where the drive ICs are joined and connected to the electrode terminals disposed on the outer surface of the recording head, and then the FPC is joined and connected to electrode terminals of pullout wirings disposed in the recording head (e.g., see JP-A No. 9-323414)

However, in both cases, because wirings with a fine pitch (e.g., a pitch equal to or less than 10 μm) cannot be formed, there has been the problem that when the nozzle density becomes high, the size of the mounting substrate and the FPC becomes large, the compactness of the recording head is inhibited, and the cost of the recording head increases. There has also been the problem that when the nozzle density becomes high, wirings having a desired resistance cannot be pulled around. In other words, there is a limit on increasing the density of the nozzles due to the restriction of the wiring density.

SUMMARY OF THE INVENTION

In view of these circumstances, the present invention provides a method of manufacturing a liquid droplet ejection head that is configured so that the density of the nozzles may be increased, narrow pitch wires may be formed in accompaniment therewith, and which is compact. The present invention also provides a liquid droplet ejection head manufacturing by this manufacturing method and a liquid droplet ejection apparatus disposed with this liquid droplet ejection head.

A first aspect of the invention provides a method of manufacturing a liquid droplet ejection head including nozzles that eject liquid droplets, pressure chambers that are communicated with the nozzles and filled with a liquid, a diaphragm that configures part of the pressure chambers, a pool chamber that pools the liquid supplied to the pressure chambers via flow paths, and piezoelectric elements that cause the diaphragm to be displaced, the method including: disposing the diaphragm on a support substrate; disposing the piezoelectric elements on the diaphragm; disposing a top plate including wirings on the diaphragm; and removing the support substrate from the diaphragm to form a piezoelectric element substrate and joining a flow path substrate, in which the pressure chambers are formed, to the piezoelectric element substrate.

According to this method, the piezoelectric element substrate configuring the liquid droplet ejection head is manufactured in a state where it is supported by the support substrate. Thus, the liquid droplet ejection head can be manufactured easily. Also, because the pressure chambers can be disposed in mutual proximity, the nozzles disposed in the pressure chambers can be disposed in a high density. Thus, because the number of parts can be reduced, the liquid droplet ejection head can be configured compactly. Also, by using this manufacturing method, a photolithographic technique used in a semiconductor process can be used to form the wirings pulled out from the piezoelectric elements, and fine wirings with a pitch of 10 μm or less can be formed. Thus, the method can accommodate increasing the density of the nozzles with a practical wiring resistance. Therefore, an increase in the resolution can be realized.

BRIEF DESCRIPTION OF THE DRAWINGS

Embodiments of the present invention will be described in detail with reference to the following drawings, wherein.

DETAILED DESCRIPTION OF THE INVENTION

Figure 1:
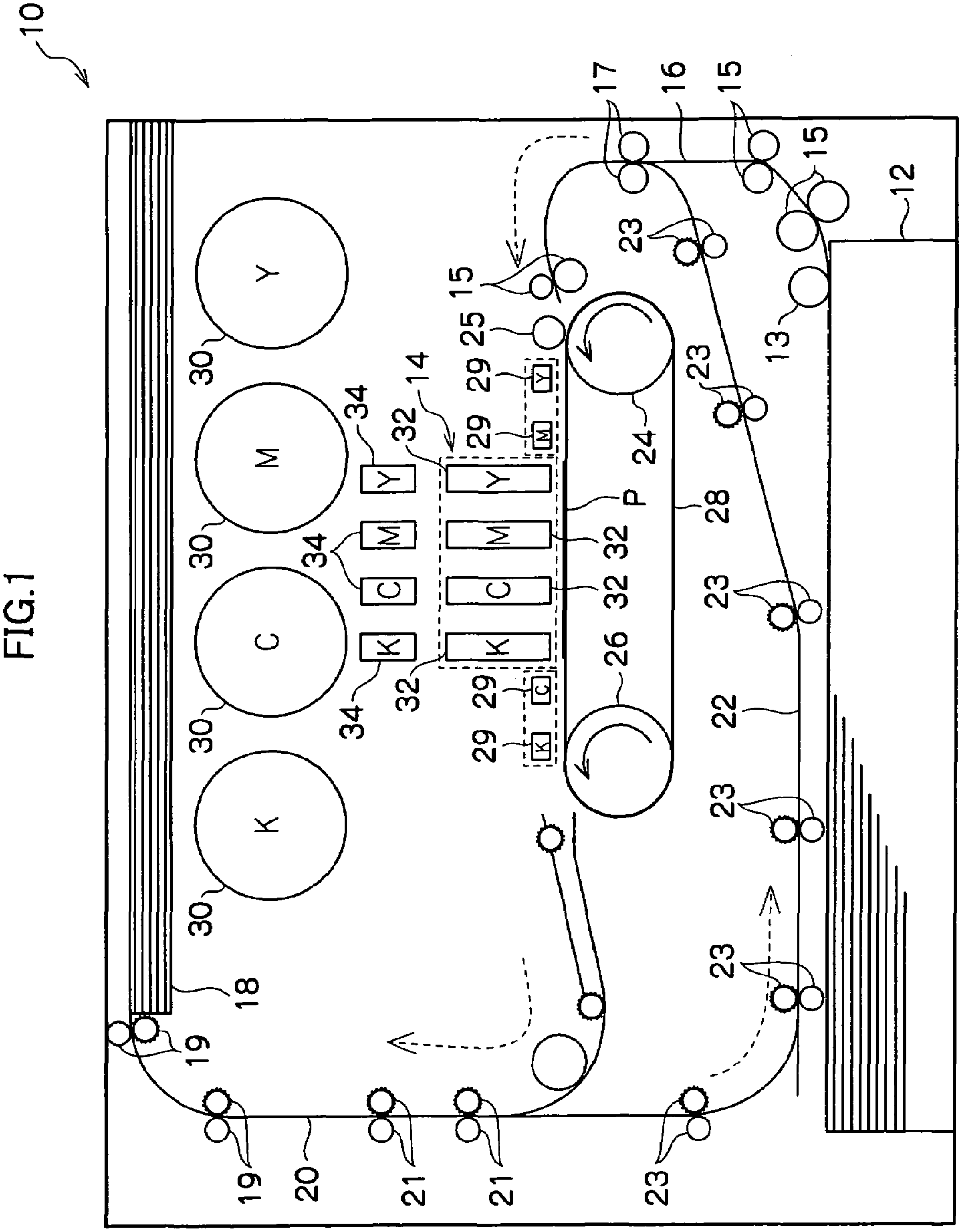
FIG. 1 is a schematic side view showing, at the time of printing, an inkjet recording apparatus pertaining to an embodiment of the invention.
Figure 2:
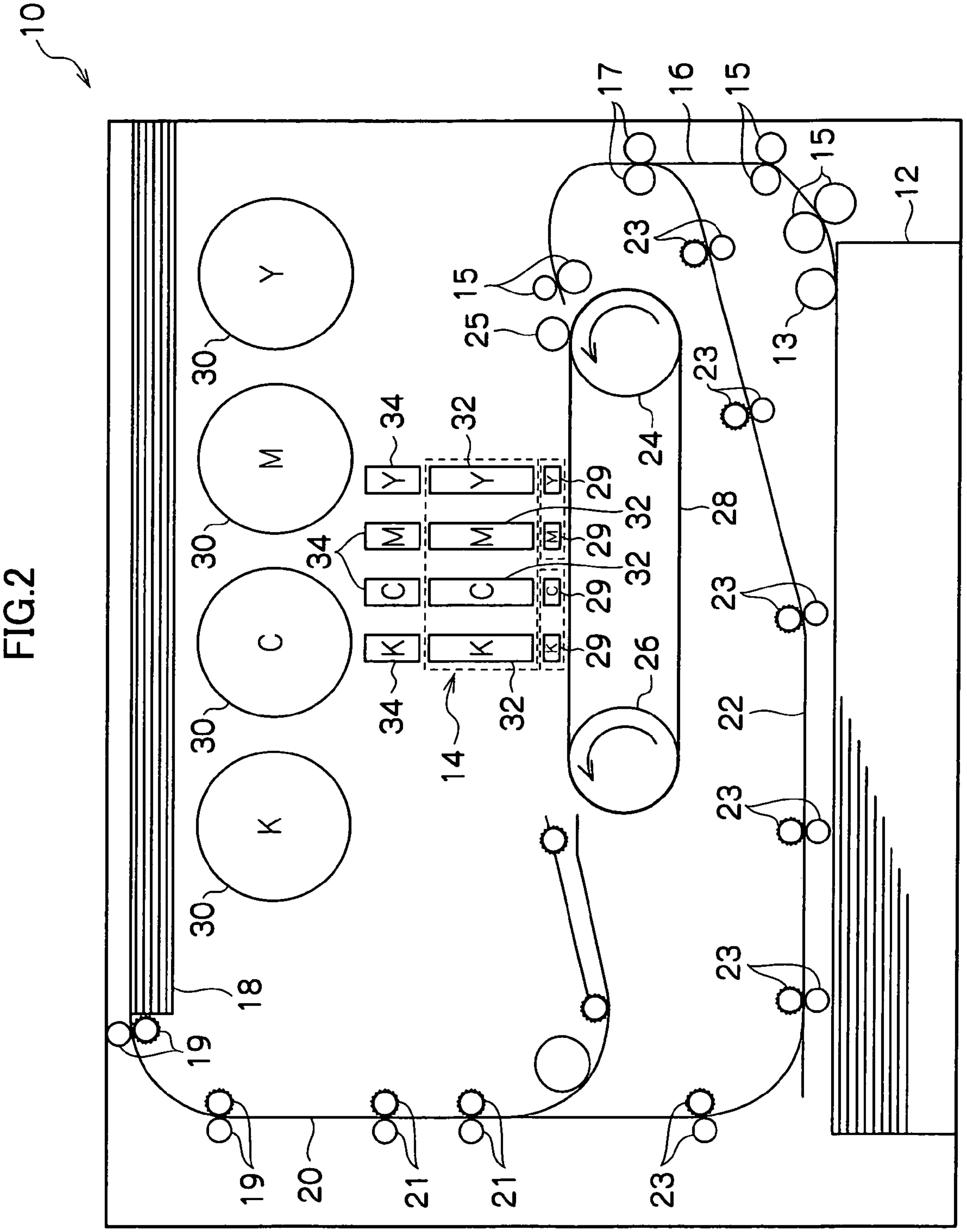
FIG. 2 is a schematic side view showing, at the time of maintenance, the inkjet recording apparatus of FIG. 1.

The best mode of implementing the invention will be described in detail below on the basis of an embodiment shown in the drawings. The liquid droplet ejection apparatus will be described using an inkjet recording apparatus as an example. Thus, ink will be used as the liquid, and an inkjet recording head will be used as the liquid droplet ejection head. Also, recording paper will be used as the recording medium. FIGS. 1 and 2 show the schematic configuration of an inkjet recording apparatus 10 pertaining to the invention.

As shown in FIGS. 1 and 2, the inkjet recording apparatus 10 includes a paper supply tray 12 in which recording paper P is accommodated, a recording section 14 that records an image on the recording paper P supplied from the paper supply tray 12, a first conveyance section 16 that conveys the recording paper P to the recording section 14, a paper exit tray 18 that accommodates the recording paper P on which the image has been recorded by the recording section 14, a second conveyance section 20 that conveys the recording paper P on which the image has been recorded to the paper exit tray 18, and an inversion section 22 that is disposed between the second conveyance section 20 and the first conveyance section 16, and which inverts the recording paper P in the case of duplex printing and again supplies the recording paper P to the recording unit 14.

The recording section 14 includes inkjet recording heads 32. The inkjet recording heads 32 include recordable regions that are the same as, or greater than, the maximum width of the recording paper P for which image recording by the inkjet recording apparatus 10 is assumed. In other words, the inkjet recording heads 32 are full-width array (FWA) inkjet recording heads capable of single-pass printing.

The inkjet recording heads 32 are arranged in the order of yellow (Y), magenta (M), cyan (C) and black (K) from the upstream side of the conveyance direction of the recording paper P. The inkjet recording heads 32Y to 32K are configured to eject ink using a known format such as the thermal format or the piezoelectric format.

The inkjet recording heads 32Y to 32K are disposed with maintenance units 29Y to 29K. The maintenance units 29Y to 29K are divided into two groups, one including black (K) and cyan (C) and the other including magenta (M) and yellow (Y), and are configured to be movable to an evacuated position at the time of printing and a position where they maintain the inkjet recording heads 32Y to 32K.

Each of the maintenance units 29Y to 29K includes a dummy jet receiver, a wiping member and a cap. At the time the maintenance units 29Y to 29K maintain the inkjet recording heads 32Y to 32K, the inkjet recording heads 32Y to 32K rise to a predetermined height (see FIG. 2). Then, the maintenance units 29Y to 29K are disposed facing nozzles 56 (see FIG. 3) of the inkjet recording heads 32Y to 32K.

The recording paper P in the paper supply tray 12 is taken out one sheet at a time by a pickup roller 13 and sent to the recording section 14 by the first conveyance section 16. The first conveyance section 16 includes plural conveyance roller pairs 15 that are disposed at appropriate positions and are for conveying the recording paper P. The recording paper P is again supplied from the later-described inversion section 22 to a predetermined conveyance roller pair 17.

The recording section 14 includes a drive roller 24 disposed at the upstream side of the paper conveyance direction, a driven roller 26 disposed at the downstream side, and a conveyor belt 28 that is wound around the drive roller 24 and the driven roller 26 and is for causing the printing surface of the recording paper P to face the inkjet recording heads 32. The conveyor belt 28 is configured to be circulated and driven (rotated) in the counter-clockwise direction of FIG. 1. A nip roller 25 that slides against and contacts the surface of the conveyor belt 28 is disposed at an upper portion of the drive roller 24.

The second conveyance section 20 includes plural conveyance roller pairs 19 that are disposed at appropriate positions and are for conveying the recording paper P. Predetermined roller pairs 21 are configured to send the recording paper P to the later-described inversion section 22. The inversion section 22 includes plural conveyance roller pairs 23 that are disposed at appropriate positions and are for conveying the recording paper P, and is configured to convey the recording paper P from the conveyance roller pairs 21 to the conveyance roller pair 17 in a state where the printed surface of the recording paper P faces up.

In other words, in the case of duplex printing, an image is first formed on one side (surface) of the recording paper P as a result of the recording paper P being supplied to the recording section 14 and passing below the inkjet recording heads 32Y to 32K. Then, when the trailing end of the recording-paper P is nipped by the downstream conveyance roller pair 21, the conveyance roller pair 21 rotates in the opposite direction, whereby the recording paper P is sent to the inversion section 22 and then sent to the conveyance roller pair 17 by the conveyance roller pairs 23.

Then, the recording paper P is nipped in the conveyance roller pair 17 and again supplied between the conveyor belt 28 and the nip roller 25. At this time, the recording paper P is supplied to the recording section 14 so that the side of the recording paper P that has not been printed faces the inkjet recording heads 32Y to 32K. In this manner, the front and back of the recording paper P are inverted, an image is formed on the other side (undersurface) of the recording paper P, and the recording paper P is discharged to the paper exit tray 18 by the second conveyance section 20.

The inkjet recording apparatus 10 also includes reservoir tanks 34Y, 34M, 34C and 34K that supply ink to the inkjet recording heads 32Y to 32K. Main tanks 30Y, 30M, 30C and 30K are connected to the reservoir tanks 34Y to 34K. The main tanks 30Y to 30K are filled with water-based pigment ink, for example.

Figure 3:
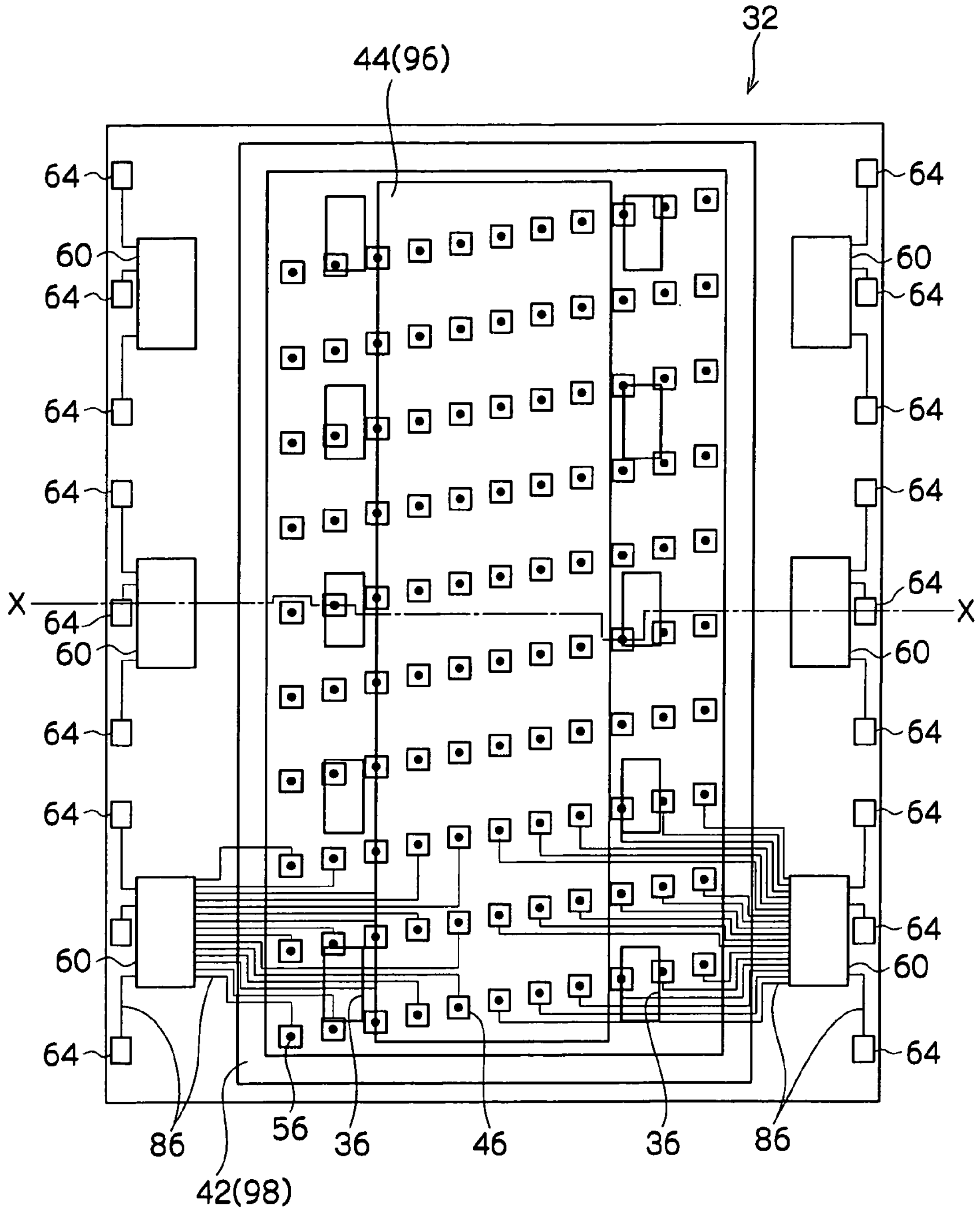
FIG. 3 is a schematic plan view showing the configuration of an inkjet recording head of FIG. 1.
Figure 4:
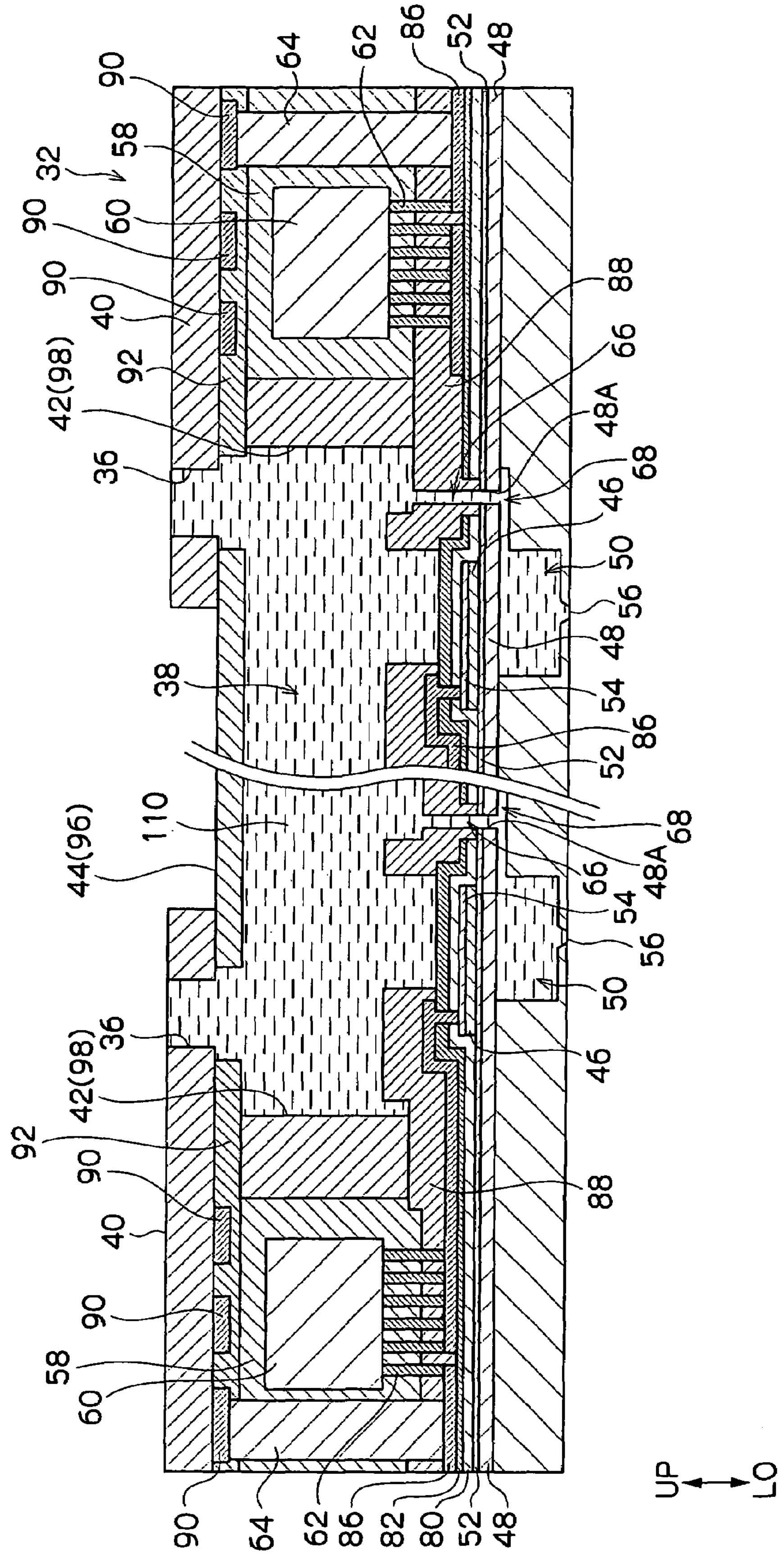
FIG. 4 is a schematic cross-sectional view along line X-X of FIG. 3.

The inkjet recording heads 32 in the inkjet recording apparatus 10 with this configuration will be described in further detail below. FIG. 3 is a schematic plan view showing the configuration of one of the inkjet recording heads 32, and FIG. 4 is a cross-sectional view along line X-X of FIG. 3. As shown in FIGS. 3 and 4, the inkjet recording head 32 includes ink supply ports 36 that are communicated with the reservoir tank 34 (see FIGS. 1 and 2), and ink 110 injected from the ink supply ports 36 is accumulated in an ink pool chamber 38.

The capacity of the ink pool chamber 38 is defined by a top plate 40 and a partition wall 42, and the ink supply ports 36 are plurally disposed in rows at predetermined places in the top plate 40. An air damper 44 (a later-described photosensitive dry film 96) that is made of a resin film and alleviates pressure waves is disposed between the rows of ink supply ports 36 and inside the ink pool chamber 38 at the inner side of the top plate 40.

Any material may be used for the top plate 40 as long as it is an insulator having a strength sufficient for the top plate 40 to act as a support for the inkjet recording head 32, such as glass, ceramic, silicon, or resin. Metal wirings 90 for conducting electricity to later-described drive ICs 60 are disposed at the top plate 40. The metal wirings 90 are covered and protected by a resin film 92 to prevent the metal wirings 90 from being corroded by the ink 110.

The partition wall 42 is molded with resin (a later-described photosensitive dry film 98) and partitions the ink pool chamber 38 in a rectangular shape. The ink pool chamber 38 is vertically divided by a piezoelectric element 46 and a pressure chamber 50 via a diaphragm 48 that is elastically deformed in the vertical direction by the piezoelectric element 46.

In other words, the piezoelectric element 46 and the diaphragm 48 are disposed between the ink pool chamber 38 and the pressure chamber 50, so that the ink pool chamber 38 and the pressure chamber 50 are not present in the same horizontal plane. Thus, the pressure chambers 50 can be disposed in mutual proximity, and the nozzles 56 can be disposed in a high density in a matrix.

The piezoelectric element 46 is attached to the upper surface of the diaphragm 48 of each pressure chamber 50. The diaphragm 48 is molded with a metal such as SUS, is elastic in at least the vertical direction, and is elastically deformed (displaced) in the vertical direction when electricity is conducted (when a voltage is applied) to the piezoelectric element 46.

It will be noted that the diaphragm 48 may be configured by an insulating material such as silicon or glass, as described later. A lower electrode 52 having one polarity is disposed on the undersurface of the piezoelectric element 46, and an upper electrode 54 having the other polarity is disposed on the upper surface of the piezoelectric element 46. The drive IC 60 is electrically connected to the upper electrode 54 by a metal wiring 86.

The piezoelectric element 46 is covered and protected by a low water-permeable insulating film (SiOx film) 80. Because the low water-permeable insulating film (SiOx film) 80 covering and protecting the piezoelectric element 46 is attached so that the piezoelectric element 46 becomes less permeable to moisture, moisture can be prevented from ingressing into the inside of the piezoelectric element 46 and lowering the reliability of the piezoelectric element 46 (i.e., deterioration of the piezoelectric characteristics arising due to the reduction of oxygen in the PZT film can be prevented). It will be noted that the diaphragm 48 made of metal (such as SUS) contacting the lower electrode 52 is also configured to function as a ground wiring with low resistance.

The piezoelectric element 46 is also protected and covered by a resin film 82 disposed on the upper surface of the low water-permeable insulating film (SiOx film) 80. Thus, the piezoelectric element 46 is configured to withstand corrosion from the ink 110. The metal wiring 86 is also covered and protected by a resin protective film 88 to prevent the metal wiring 86 from being corroded by the ink 110.

The area above the piezoelectric element 46 is protected and covered by the resin film 82, but is not covered by the resin protective film 88. Due to this configuration, the displacement of the piezoelectric element 46 (the diaphragm 48) is prevented from being inhibited because the resin film 82 is a flexible resin layer (i.e., the resin film 82 is suitably elastically deformable in the vertical direction). In other words, the resin layer above the piezoelectric element 46 is not covered by the resin protective film 88 because the thinner the resin layer is, the greater the effect of reducing displacement inhibition becomes.

The drive IC 60 is disposed between the top plate 40 and the diaphragm 48 at the outer side of the ink pool chamber 38 defined by the partition wall 42, and is configured so as to not be exposed (to not protrude) from the diaphragm 48 and the top plate 40. Thus, the inkjet recording head 32 can be configured compactly.

Figure 5:
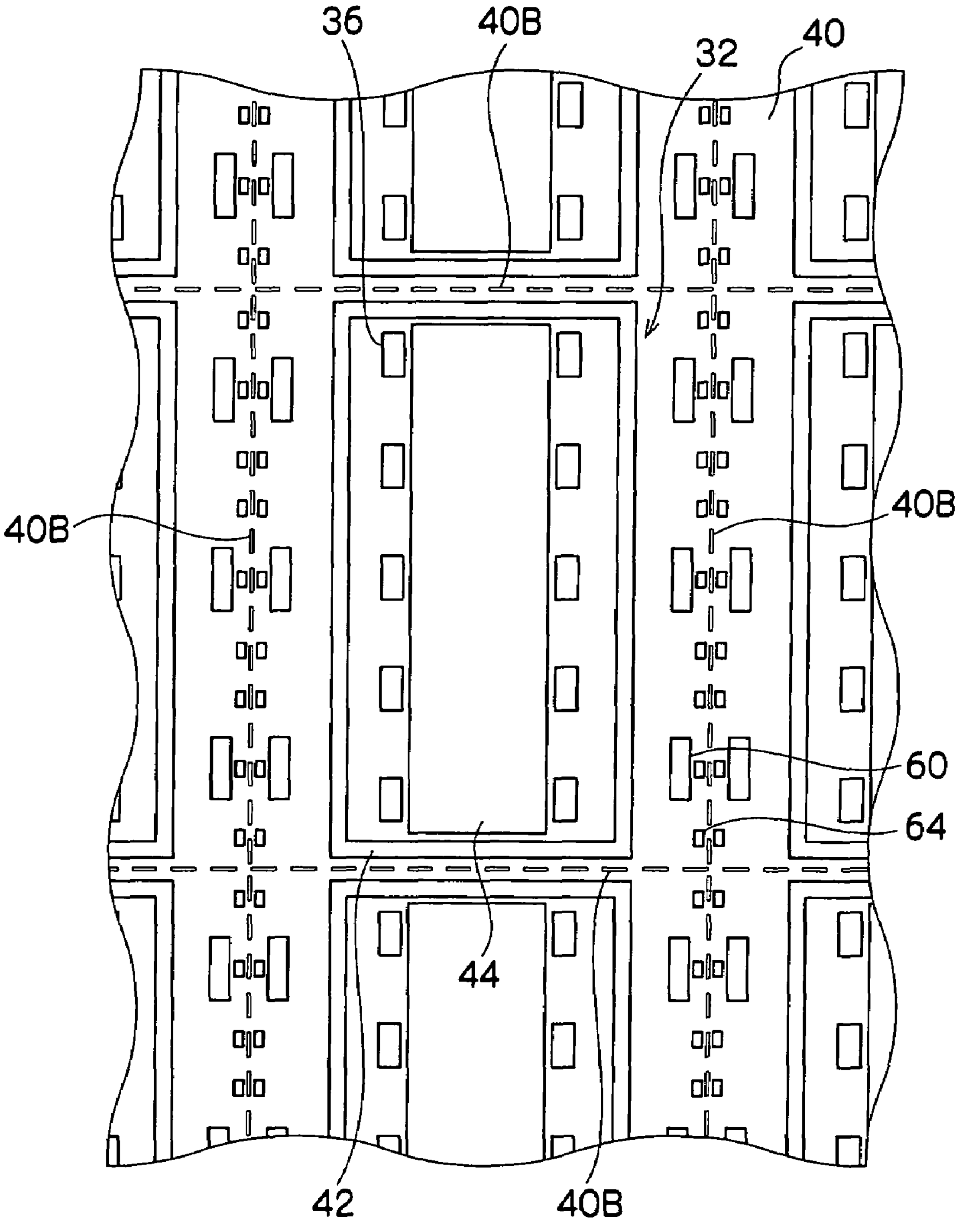
FIG. 5 is a schematic plan view showing a top plate before the inkjet recording head of FIG. 1 is cut as an inkjet recording head.

The periphery of the drive IC 60 is sealed with a resin material 58. As shown in FIG. 5, plural injection ports 40B for injecting the resin material 58 sealing the drive ICs 60 are disposed in a grid-like manner in the top plate 40 during the stage of manufacture to divide the inkjet recording heads 32.

Thus, after a later-described piezoelectric element substrate 70 and flow path substrate 72 are bonded (joined) together, the top plate 40 is cut along the injection ports 40B sealed (closed) by the resin material 58, whereby a plurality of the inkjet recording heads 32 including the nozzles 56 in the matrix (see FIG. 3) are manufactured at one time.

Figure 6:
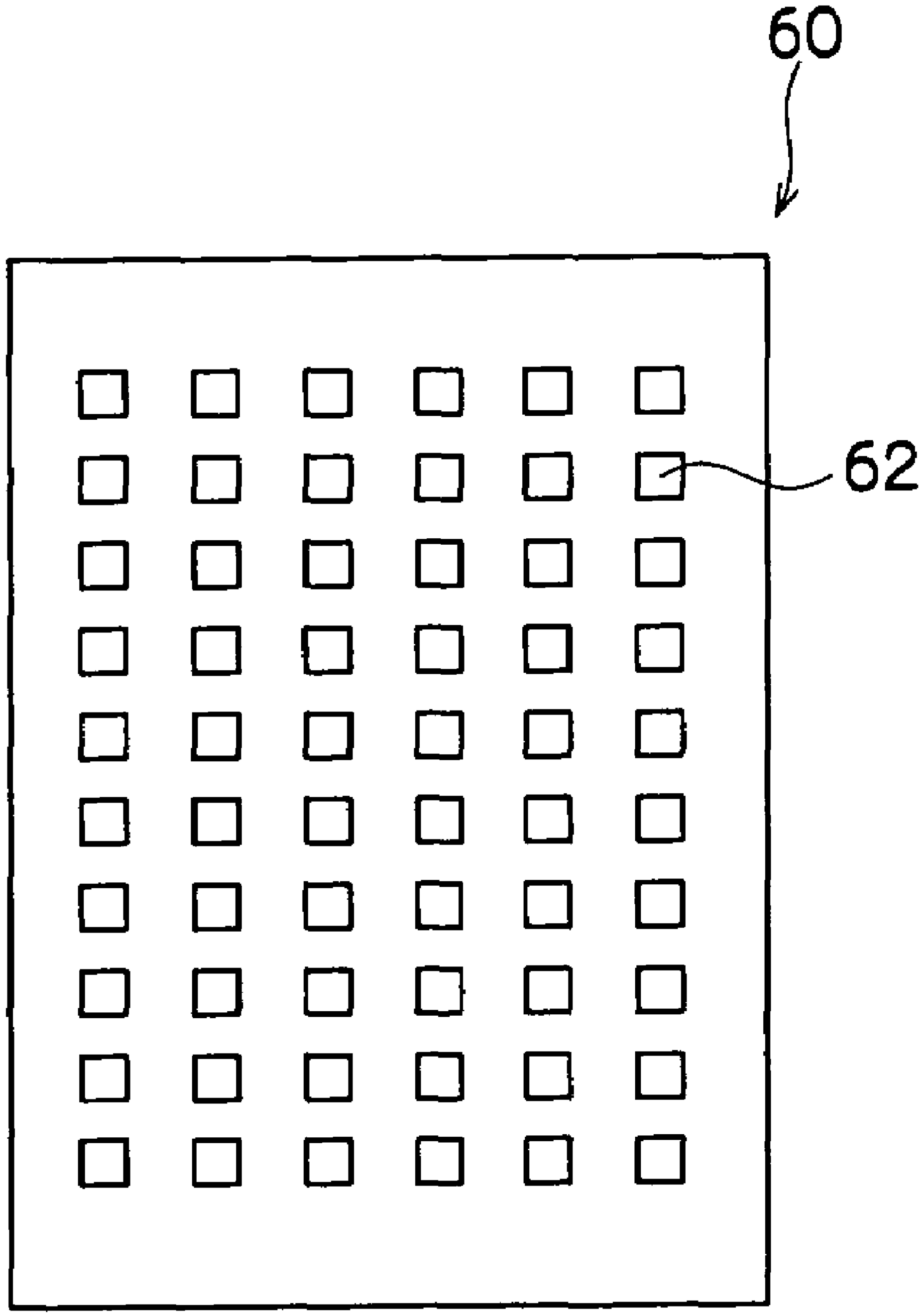
FIG. 6 is a schematic plan view showing bumps of a drive IC of FIG. 5.

As shown in FIGS. 4 and 6, plural bumps 62 are disposed in a matrix on the undersurface of the drive IC 60 so as to project to a predetermined height. The drive IC 60 is flip-chip mounted on the metal wiring 86 of the piezoelectric element substrate 70 in which the piezoelectric element 46 is formed on the diaphragm 48. Thus, high-density connection with respect to the piezoelectric element 46 can be easily realized, and the height of the drive IC 60 can be reduced (can be thinned). Due to this also, the inkjet recording head 32 can be configured compactly.

As shown in FIG. 3, bumps 64 are also disposed at the outer side of the drive ICs 60. These bumps 64 connect the metal wirings 90 disposed at the top plate 40 to the metal wirings 86 disposed at the piezoelectric element substrate 70. Of course, the bumps 64 are disposed higher than the height of the drive ICs 60 mounted on the piezoelectric element substrate 70.

Thus, electricity is conducted from the body side of the inkjet recording apparatus 10 to the metal wirings 90 of the top plate 40, electricity is conducted from the metal wirings 90 of the top plate 40 to the metal wirings 86 via the bumps 64, and electricity is conducted from there to the drive ICs 60. Then, a voltage is applied to the piezoelectric elements 46 at a predetermined timing, and the diaphragm 48 is elastically deformed in the vertical direction. Thus, the ink 110 filling the inside of the pressure chambers 50 is pressurized, and ink droplets are ejected from the nozzles 56.

One nozzle 56 ejecting the ink droplets is disposed for each pressure chamber 50, and the nozzles 56 are disposed at predetermined positions in the pressure chambers 50. The pressure chamber 50 and the ink pool chamber 38 are connected to each other as a result of an ink flow path 66, which passes through a through hole 48A disposed in the diaphragm 48, and an ink flow path 68, which is disposed so as to extend from the pressure chamber 50 in the horizontal direction of FIG. 4, being communicated with each other in avoidance of the piezoelectric element 46. The ink flow path 68 is disposed slightly longer than the portion actually connecting to the ink flow path 66 so that the ink flow path 68 can be aligned (be reliably communicated) with the ink flow path 66 at the time the inkjet recording head 32 is manufactured.

Figure 7:
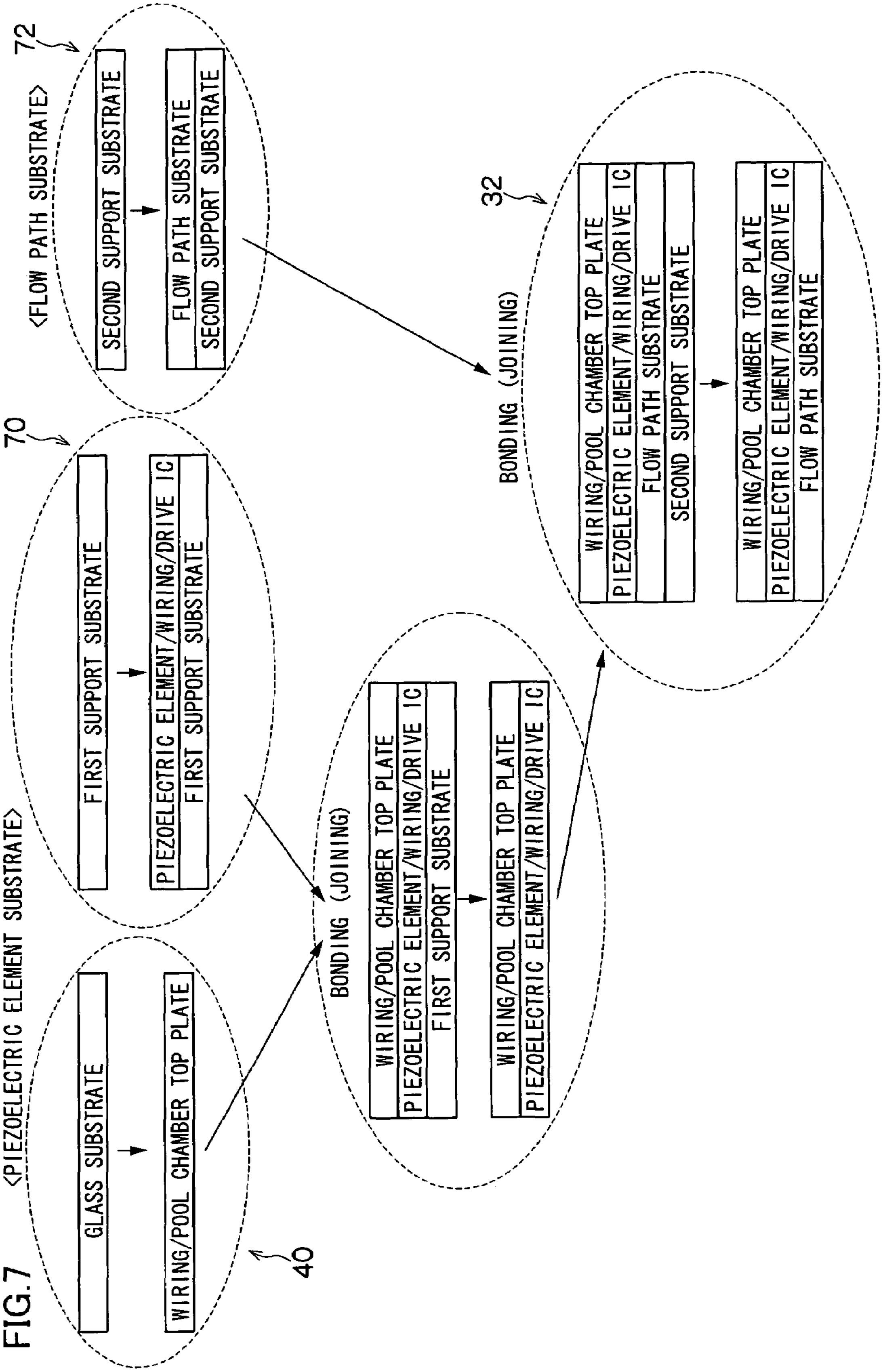
FIG. 7 is an explanatory diagram showing the entire process of manufacturing the inkjet recording head of FIG. 1.

Next, the method of manufacturing the inkjet recording head 32 with this configuration will be described in detail on the basis of FIGS. 7 to 13B. As shown in FIG. 7, the inkjet recording head 32 is manufactured by separately making the piezoelectric element substrate 70 and the flow path substrate 72 and bonding (joining) these together. Thus, first, the process of manufacturing the piezoelectric element substrate 70 will be described. It will be noted that the top plate 40 is bonded (joined) to the piezoelectric element substrate 70 before the flow path substrate 72.

Figures 8A, 8B, 8C, 8D, 8E:
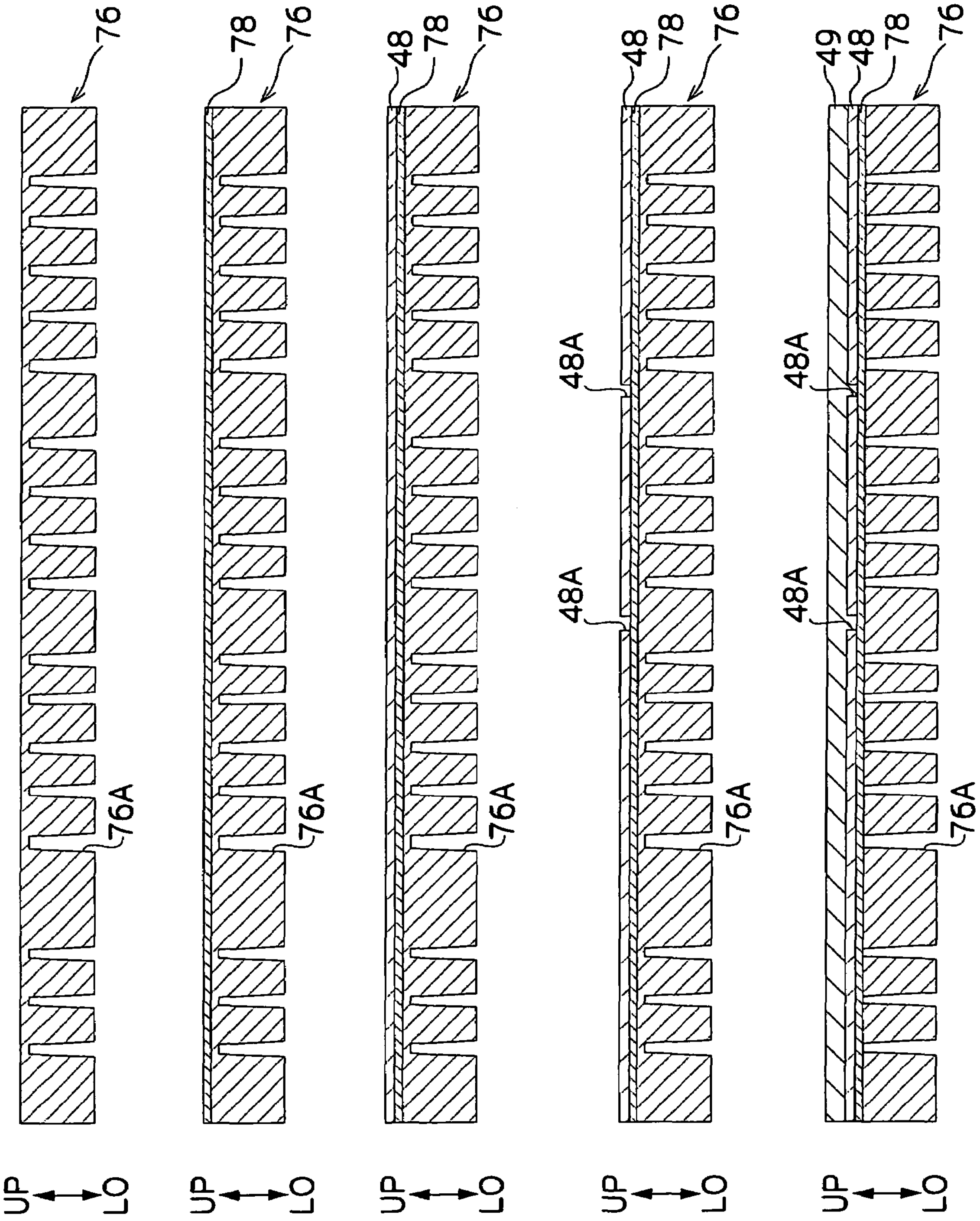
FIGS. 8A to 8M are explanatory diagrams showing the process of manufacturing a piezoelectric element substrate of the inkjet recording head of FIG. 1.

As shown in FIG. 8A, first, a first support substrate 76 is prepared which is made of glass and in which plural non-through holes 76B are disposed in the undersurface (rear surface). The first support substrate 76 may be made of any material that does not bend, and is not limited to glass. However, glass is preferable because it is hard and inexpensive. Known examples of the method of making the first support substrate 76 include blasting or femtosecond laser processing a glass substrate, and exposing and developing a photosensitive glass substrate (e.g., PEG3C, manufactured by HOYA Corporation).

Then, as shown in FIG. 8B, a germanium film (called "Ge film" below) 78 serving as a boundary separation layer is sputtered and formed (film thickness: 1 μm) on the upper surface of the first support substrate 76. The method of forming the Ge film 78 may be vapor deposition or chemical vapor deposition (CVD).

Then, as shown in FIG. 8C, a thin film of SiOx (film thickness: 4 μm) that becomes the diaphragm 48 is formed on the upper surface of the Ge film 78 by plasma CVD at a temperature of 350° C., with an RF power of 300 W, a frequency of 450 KHz, a pressure of 1.5 torr, and a gas of $SiH_4/N_2O$=150/4000 sccm. It will be noted that the material of the diaphragm 48 in this case may be an SiNx film, an SiC film, or a metal film.

Thereafter, as shown in FIG. 8D, through holes 48A for forming the ink flow path 66 are patterned in the diaphragm 48. Specifically, this is done by forming a resist using photolithography, patterning (HF-etching) the SiOx film, and then removing the resist using oxygen plasma. Then, as shown in FIGS. 8E and 8F, the undersurface side of the first support substrate 76 is etched, and the non-through holes 76B are penetrated through to become through holes 76A.

Figures 8F, 8G, 8H, 8I:
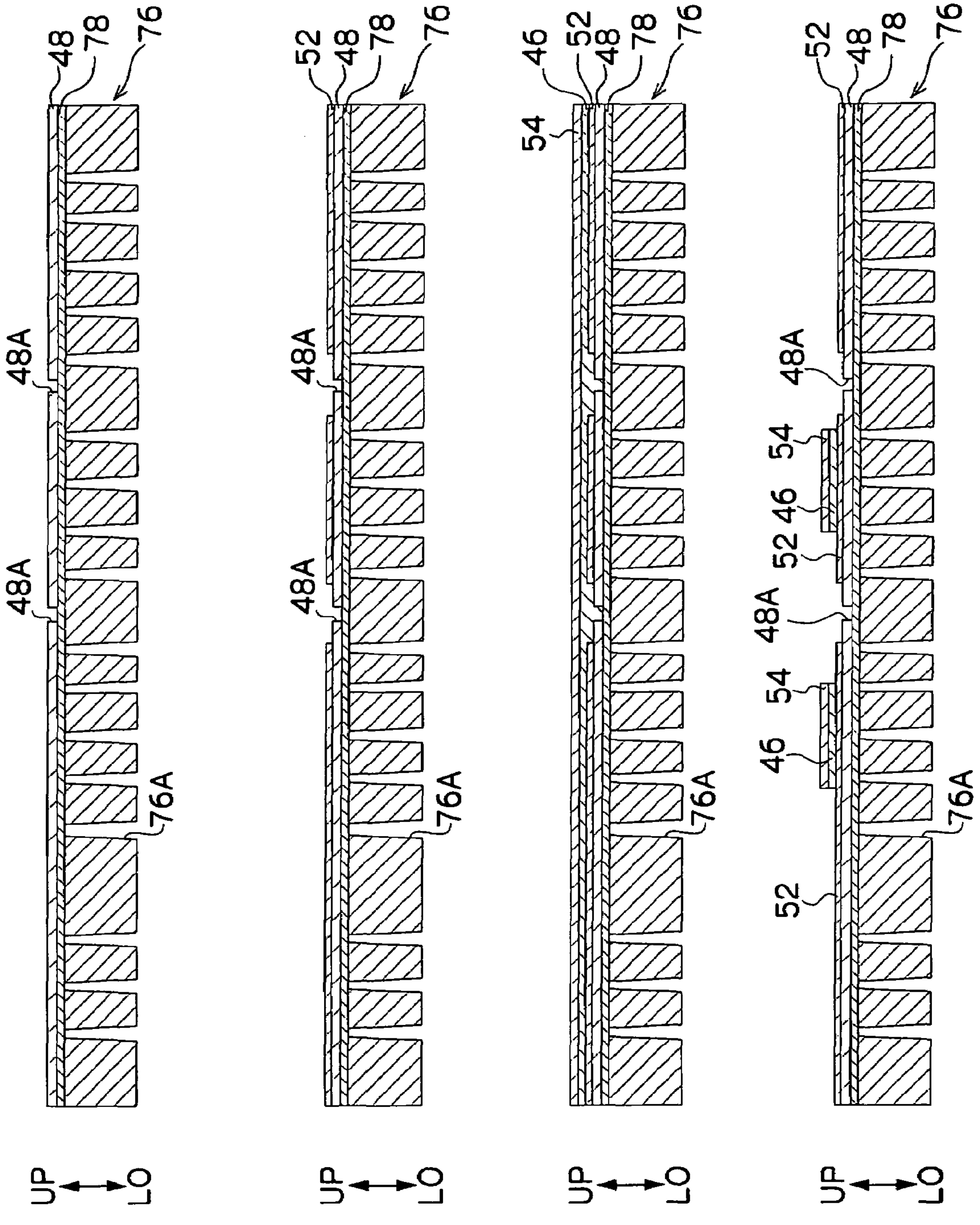

Specifically, a protective resist 49 (protective film) is applied to the upper surface of the diaphragm 48, the undersurface side of the first support substrate 76 is HF-etched (FIG. 8E) in a state where the diaphragm 48 is protected, and then the protective resist 49 is removed (FIG. 8F). It will be noted that when a material that is not to be etched with an etching liquid is used for the diaphragm 48, the protective resist 49 (protective film) is unnecessary.

Also, rather than forming the SiOx film as the diaphragm 48, a diaphragm 48 made of metal (such as SUS) may be joined to the upper surface of the first support substrate 76 using the Ge film 78. In this case, the joining temperature is 800° C. to 1000° C. For example, the joining temperature may be 850° C. and the adhesion time may be 10 minutes.

Because the Ge film 78 is heat resistant up to 1000° C., there is the advantage that restrictions do not have to be placed on the heating temperature with respect to the first support substrate 76 when forming the piezoelectric element 46 and on the temperature for crystallization annealing thereafter (e.g., 650° C.). It will be noted that in this case, an insulating substrate such as silicon or glass may be used as the material of the diaphragm 48.

Also, in this case, the Ge film 78 serving as the boundary separation layer is not limited to being formed on the surface of the first support substrate 76 to which the diaphragm 48 is adhered, and may also be formed on the surface of the diaphragm 48 to which the first support substrate 76 is adhered. Also, the Ge film 78 serving as the boundary separation layer may be formed on the first support substrate 76 and the first support substrate 76 may be joined to the diaphragm 48 by applying an adhesive (other than the Ge film) on the diaphragm 48, or the Ge film 78 serving as the boundary separation layer may be formed on the diaphragm 48 and the diaphragm 48 may be joined to the first support substrate 76 by applying an adhesive (other than the Ge film) on the first support substrate 76.

In any event, because the step of joining the diaphragm 48 may be omitted when a thin film (SiOx film) is formed on the Ge film 78 to form the diaphragm 48 rather than joining the diaphragm 48 to the Ge film 78, there is the advantage that the entire manufacturing process is simplified. Also, because the diaphragm 48 does not have to be exposed to a high temperature (in the step of joining using the Ge film), there is also the effect that there are more options for the material that can be used for the diaphragm 48, such as being able to use a material with low heat resistance. It also becomes suitable for film thinning in comparison to adhering a thin diaphragm 48 made of metal or an insulating material. In other words, a thinness of 10 μm or less can be accommodated, there are few pinholes, and the evenness of the film thickness is good.

Additionally, care is taken so that the through holes 48A in the diaphragm 48 and the through holes 76A in the first support substrate 76 do not overlap. The reason for this is to ensure that the various materials used during manufacture do not leak from the upper surface to the undersurface of the first support substrate 76.

Also, the reason for disposing plural through holes 76A in the first support substrate 76 is because hydrogen peroxide ($H_2O_2$) serving as a solvent (separation solution) in a later step flows into the boundary (Ge film layer) between the first support substrate 76 and the diaphragm 48, whereby the Ge film 78 serving as the boundary separation layer is dissolved and the first support substrate 76 is separated from the diaphragm 48.

Thus, it is preferable for the through holes 76A (non-rough holes 76B) to be disposed in a tapered manner so that their cross section (open hole area) becomes smaller from below to above (from the injection port side of the undersurface to the diaphragm 48 side of the upper surface) as shown in the drawings. By giving the through holes 76A this shape, the supply of the separation solution (hydrogen peroxide) to the Ge film layer boundary can be excellently maintained.

Next, as shown in FIG. 8G, the lower electrode 52 laminated on the upper surface of the diaphragm 48 is patterned. Specifically, this is done by sputtering a metal film (film thickness: 500 Å to 3000 Å), forming a resist using photolithography, patterning (etching) the metal film, and then separating the resist using oxygen plasma. The lower electrode 52 has a ground potential.

Then, as shown in FIG. 8H, a PZT film that is the material of the piezoelectric element 46 and the upper electrode 54 are deposited in order by sputtering them on the upper surface of the lower electrode 52, and as shown in FIG. 8I, the piezoelectric element 46 (PZT film) and the upper electrode 54 are patterned.

Specifically, this is done by sputtering a PZT film (film thickness: 3 μm to 15 μm), sputtering a metal film (film thickness: 500 Å to 3000 Å), forming a resist using photolithography, patterning (etching) the PZT film and the metal film, and then removing the resist using oxygen plasma. Examples of the material for the lower and upper electrodes include Au, Ir, Ru and Pt, which have a high affinity with the PZT material that is the piezoelectric element and are heat-esistant.

Figure 8J:
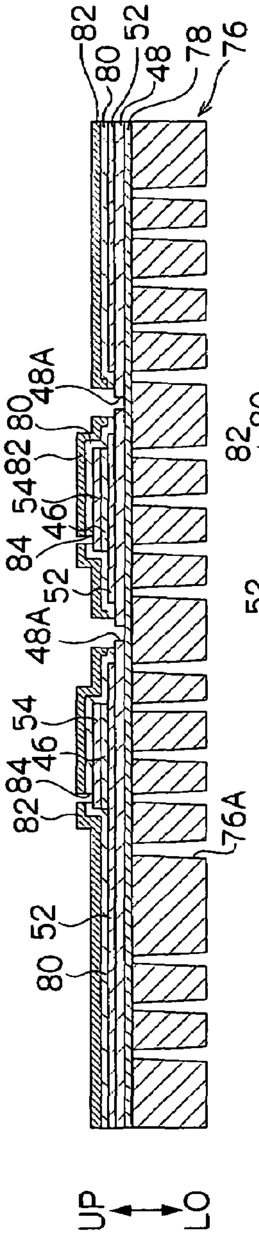

Thereafter, as shown in FIG. 8J, the low water-permeable insulating film (SiOx film) 80 is formed on the upper surfaces of the lower electrode 52 and the upper electrode 54 exposed to the upper surface, the resin film 82 (e.g., a polyimide, polyamide, epoxy, polyurethane or silicone resin film) that is ink-resistant and flexible is formed on the upper surface of the low water-permeable insulating film (SiOx film) 80, and these are patterned, whereby openings 84 (contact holes) for connecting the piezoelectric elements 46 and the metal wirings 86 are formed.

Specifically, a process is conducted where the low water-permeable insulating film (SiOx film) 80 whose dangling bond density is high is deposited using CVD, patterning is conducted by applying, exposing, and developing a photosensitive polyimide (e.g., the photosensitive polyimide DURIMIDE 7520 manufactured by FujiFilm Arch Co., Ltd.), and the SiOx film is etched using, as a mask, the photosensitive polyimide with reactive ion etching (RIE) using a $CF_4$ gas. Here, an SiOx film was used as the low water-permeable insulating film, but an SiNx film or an SiOxNy film may also be used.

Figure 8K:
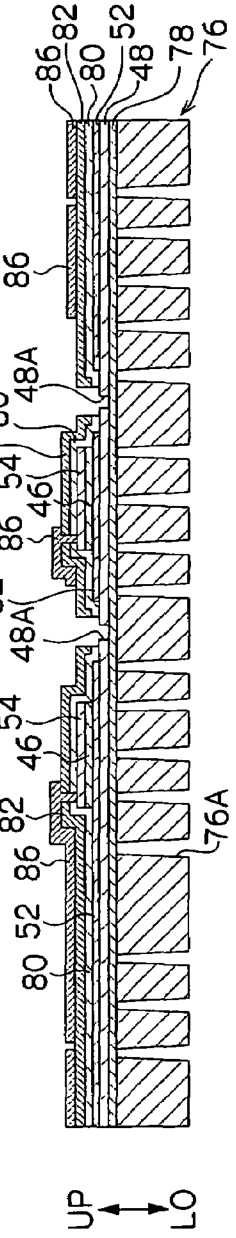

Next, as shown in FIG. 8K, a metal film is deposited on the upper surfaces of the upper electrode 54 and the resin film 82 inside the openings 84, and the metal wirings 86 are patterned. Specifically, a process is conducted where an Al film (film thickness: 1 μm) is formed by sputtering, a resist is formed using photolithography, the resist is patterned with RIE using a chlorine gas, and the resist film is separated using oxygen plasma, and then the upper electrodes 54 and the metal wirings 86 (Al film) are joined together. Although they are not shown, the openings 84 are also disposed above the lower electrodes 52, and the lower electrodes 52 are connected to the metal wirings 86 in the same manner as the upper electrodes 54.

Figure 8L:
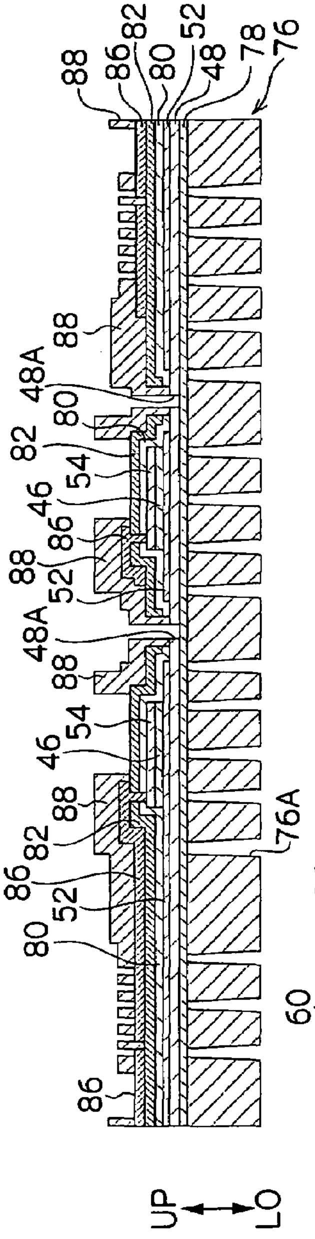

Then, as shown in FIG. 8L, the resin protective film 88 (e.g., the photosensitive polyimide DURIMIDE 7320 manufactured by FujiFilm Arch Co., Ltd.) is formed on the upper surfaces of the metal wirings 86 and the resin film 82 and patterned. The resin protective film 88 is configured by the same kind of resin material as the resin film 82. At this time, care is taken to ensure that the resin protective film 88 is not formed at the sites above the piezoelectric elements 46 where the metal wirings 86 are not patterned (so that only the resin film 82 is formed).

Here, the reason the resin protective film 88 is not formed above the piezoelectric elements 46 (i.e., on the upper surface of the resin film 82) is to prevent the displacement (elastic deformation in the vertical direction) of the diaphragm 48 (the piezoelectric elements 46) from being inhibited. When the metal wirings 86 pulled out from the upper electrodes 54 (connected to the upper electrodes 54) of the piezoelectric elements 46 are covered by the resin protective film 88, the joining strength of these covering the metal wirings 86 becomes strong and the metal wirings 86 can be prevented from being corroded by the ink 110 ingressing from the boundary, because the resin protective film 88 is configured by the same kind of resin material as the resin film 82 on which the metal wirings 86 are formed.

It will be noted that the joining strength with respect to the partition wall 42 (the photosensitive dry film 98) also becomes strong because the resin protective film 88 is configured by the same kind of resin material as the partition wall 42 (the photosensitive dry film 98). Thus, ingress of the ink 110 from the boundary is further prevented. Also, when the resin protective film 88 is configured by the same kind of resin material as the partition wall 42, there is the advantage that there is less heat stress because the coefficients of thermal expansion of these become substantially equivalent.

Figure 8M:
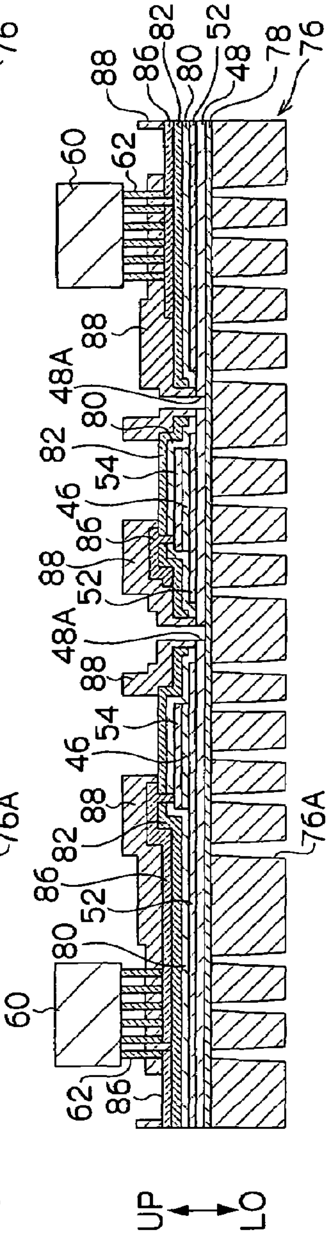

Next, as shown in FIG. 8M, the drive ICs 60 are flip-chip mounted on the metal wirings 86 via the bumps 62. At this time, the drive ICs 60 are processed to a predetermined thickness (70 μm to 300 μm) by grinding implemented at the end of a semiconductor wafer process. When the drive ICs 60 are too thick, it becomes difficult to pattern the partition wall 42 and to form the bumps 64.

Electric field plating, non-electric field plating, ball bumping, and screen printing can be applied for the method of forming the bumps 62 for flip-chip mounting the drive ICs 60 on the metal wirings 86. In this manner, the piezoelectric element substrate 70 is manufactured, and the top plate 40 made of glass, for example, is bonded (joined) to the piezoelectric element substrate 70. It will be noted that for ease of description, the wirings 90 are shown in FIGS. 9A to 9H as being formed on the undersurface of the top plate 40, but in the actual process, the wirings 90 are formed on the upper surface of the top plate 40.

Figure 9A:
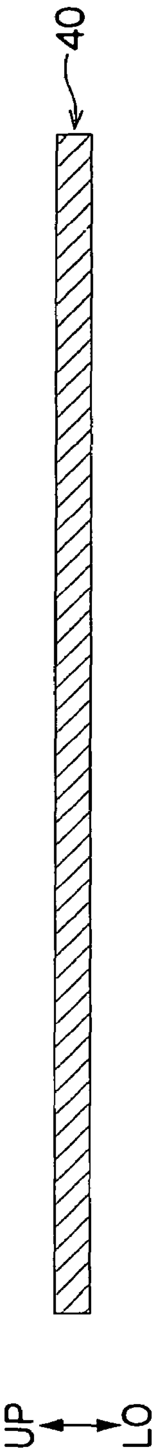
FIGS. 9A to 9H are explanatory diagrams showing the process of manufacturing the top plate of the inkjet recording head of FIG. 1.
Figure 9B:
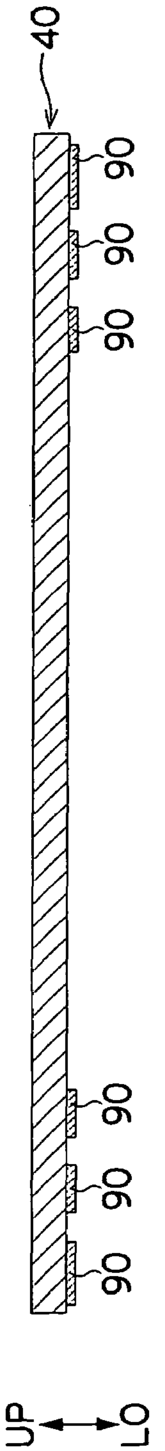

In manufacturing the glass top plate 40, as shown in FIG. 9A, the top plate 40 itself has a thickness (0.3 mm to 1.5 mm) with which can be ensured a strength sufficient for the top plate 40 to serve as a support; thus, it is not necessary to dispose a separate support. First, as shown in FIG. 9B, the metal wiring 90 is laminated on the undersurface of the top plate 40 and patterned. Specifically, this is done by a process in which an Al film (thickness: 1 μm) is formed by sputtering, a resist is formed using photolithography, the resist is etched with RIE using chlorine gas, and the resist is separated using oxygen plasma.

Figure 9C:
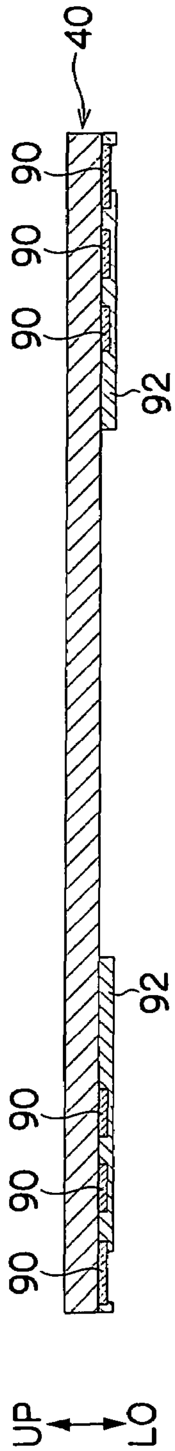

Then, as shown in FIG. 9C, the resin film 92 (e.g., the photosensitive polyimide DURIMIDE 7320 manufactured by FujiFilm Arch Co., Ltd.) is laminated on the surface on which the metal wirings 90 are formed, and the resin film 92 is patterned. It will be noted that at this time, care is taken to ensure that the resin film 92 is not laminated on some of the metal wirings 90 because the bumps 64 will be joined thereto.

Figure 9D:
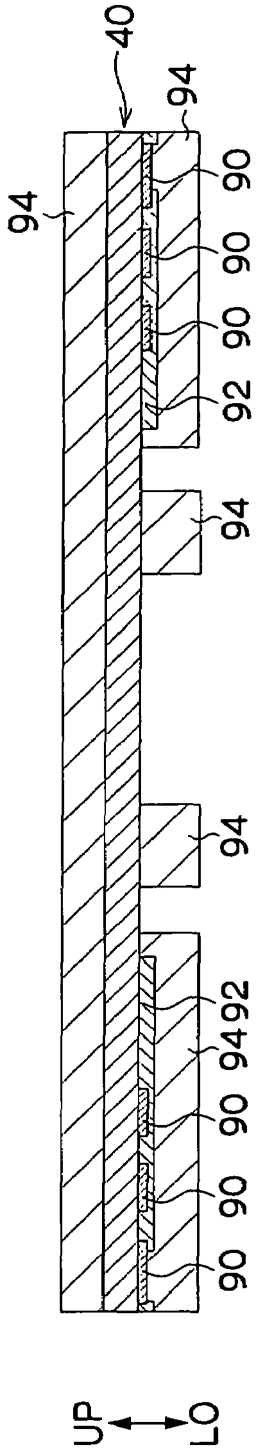

Next, as shown in FIG. 9D, a resist is patterned using photolithography on the surface of the top plate 40 on which the metal wirings 90 are formed. The entire surface on which the metal wirings 90 are not formed is covered by a protective resist 94. Here, the reason the protective resist 94 is applied is to prevent the top plate 40 from being etched, in the next wet ($SiO_2$) etching step, from the underside of the surface on which the metal wirings 90 are formed. It will be noted that the step of applying the protective resist 94 can be omitted when photosensitive glass is used for the top plate 40.

Figure 9E:
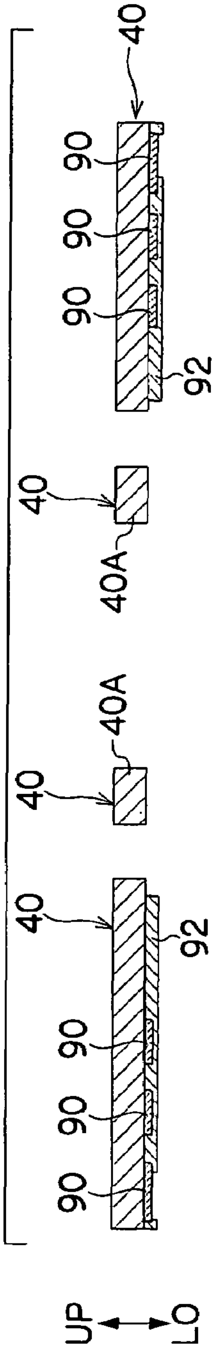
Figure 9F:
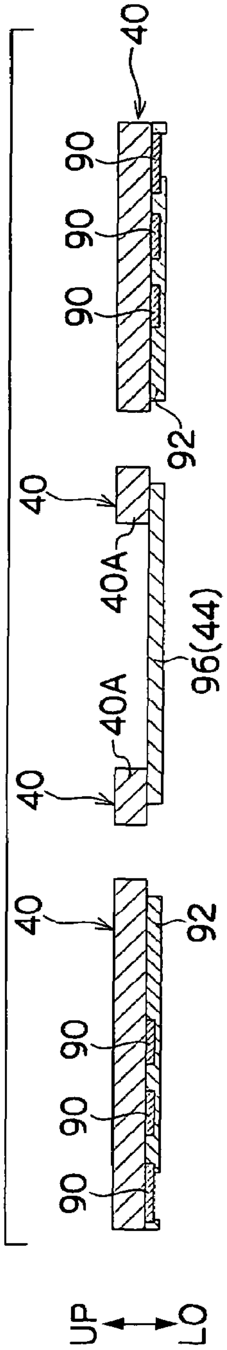
Figure 9G:
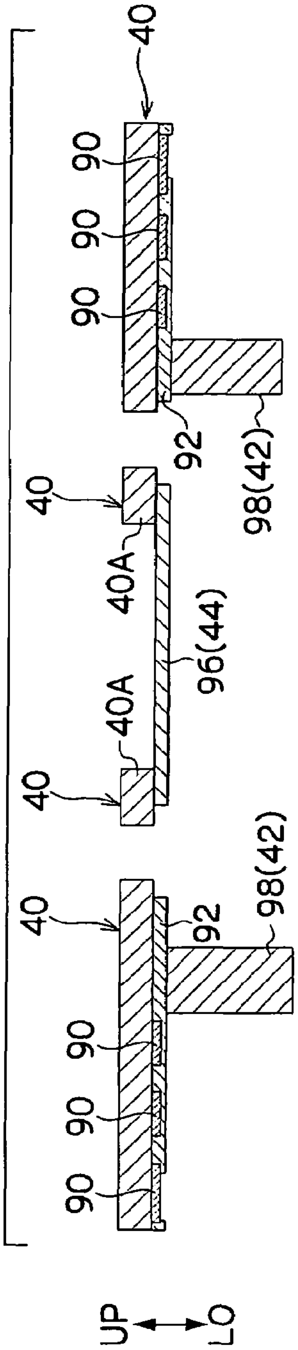

Next, as shown in FIG. 9E, wet ($SiO_2$) etching using an HF solution is conducted with respect to the top plate 40, and thereafter the protective resist 94 is separated using oxygen plasma. Then, as shown in FIG. 9F, the photosensitive dry film 96 (e.g., Raytec FR-5025 manufactured by Hitachi Chemical Co., Ltd.: 25 μm thick) is patterned (installed) by exposing and developing the photosensitive dry film 96 at the portions where the openings 40A are formed in the top plate 40. The photosensitive dry film 96 becomes the air damper 44 that alleviates the pressure waves.

Then, as shown in FIG. 9C, the photosensitive dry film 98 (100 μm thick) is laminated on the resin film 92 and patterned by exposing and developing the photosensitive dry film 98. The photosensitive dry film 98 becomes the partition wall 42 that defines the ink pool chamber 38. It will be noted that the partition wall 42 is not limited to the photosensitive dry film 98 and may also be a resin coating film (e.g., the SU-8 resist of Kayaku Microchem). In this case, the resin coating film may be applied using a spray coater and then exposed and developed.

Figure 9H:
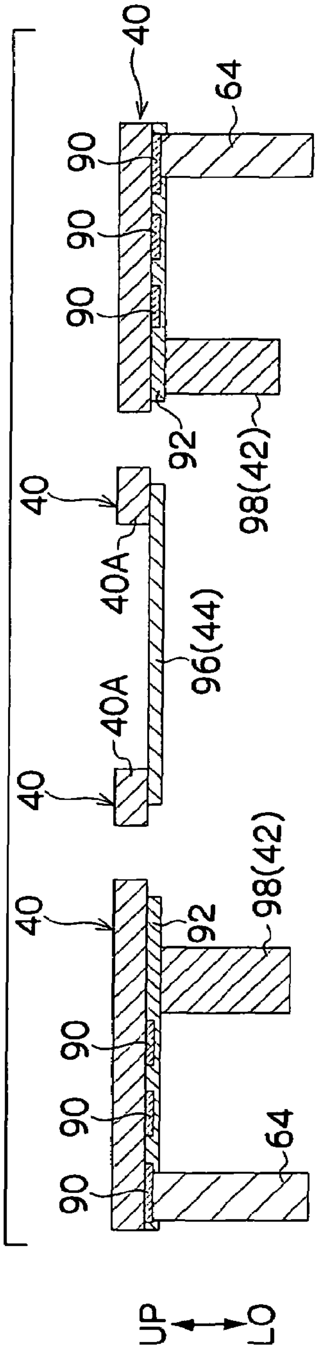

Finally, as shown in FIG. 9H, the bumps 64 are formed by plating or the like on the metal wirings 90 on which the resin film 92 has not been formed. Because the bumps 64 are electrically connected to the metal wirings 86 of the drive ICs 60, the bumps 64 are formed higher than the photosensitive dry film 98 (partition wall 42).

Figure 10A:
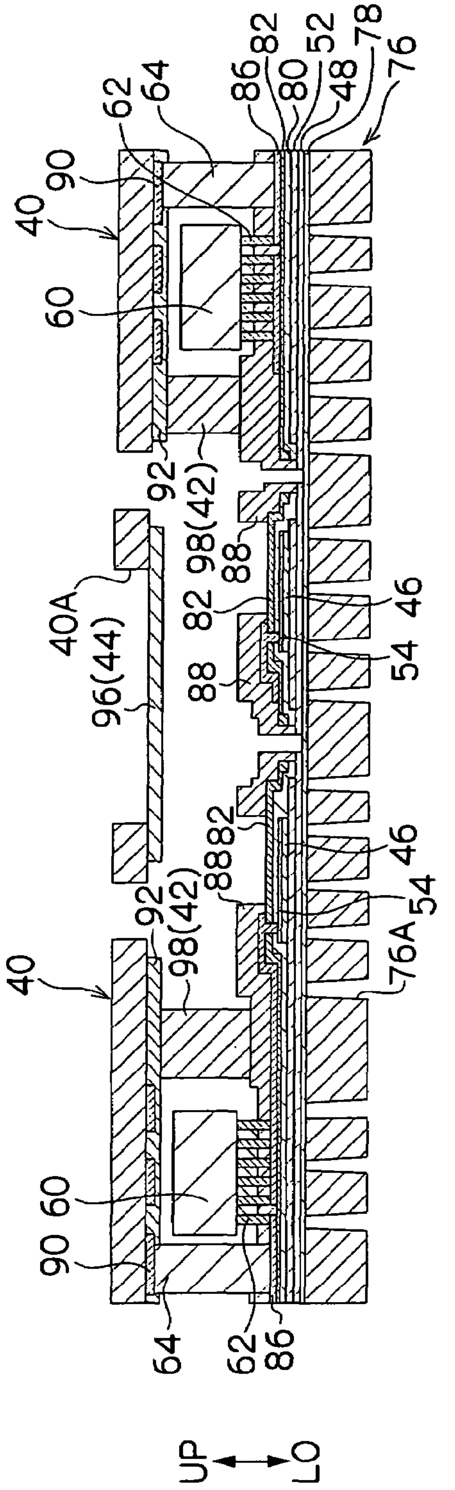
FIGS. 10A to 10D are explanatory diagrams showing the process of joining the top plate of FIG. 9H to the piezoelectric element substrate of FIG. 8M.

In this manner, when the manufacture of the top plate 40 ends, the top plate 40 is placed on the piezoelectric element substrate 70, as shown in FIG. 10A, and both are bonded (joined) together by thermocompression. Namely, the photosensitive dry film 98 (partition wall 42) is joined to the resin protective film 88 that is a photosensitive resin layer, and the bumps 64 are joined to the metal wirings 86.

At this time, because the height of the bumps 64 is higher than the height of the photosensitive dry film 98 (partition wall 42), the bumps 64 are automatically joined to the metal wirings 86 by joining the photosensitive dry film 98 (partition wall 42) to the resin protective film 88. In other words, because the height of the solder bumps 64 can be easily adjusted (reduced), it becomes easy to seal the ink pool chamber 38 with the photosensitive dry film 98 (partition wall 42) and connect the bumps 64.

Figure 10B:
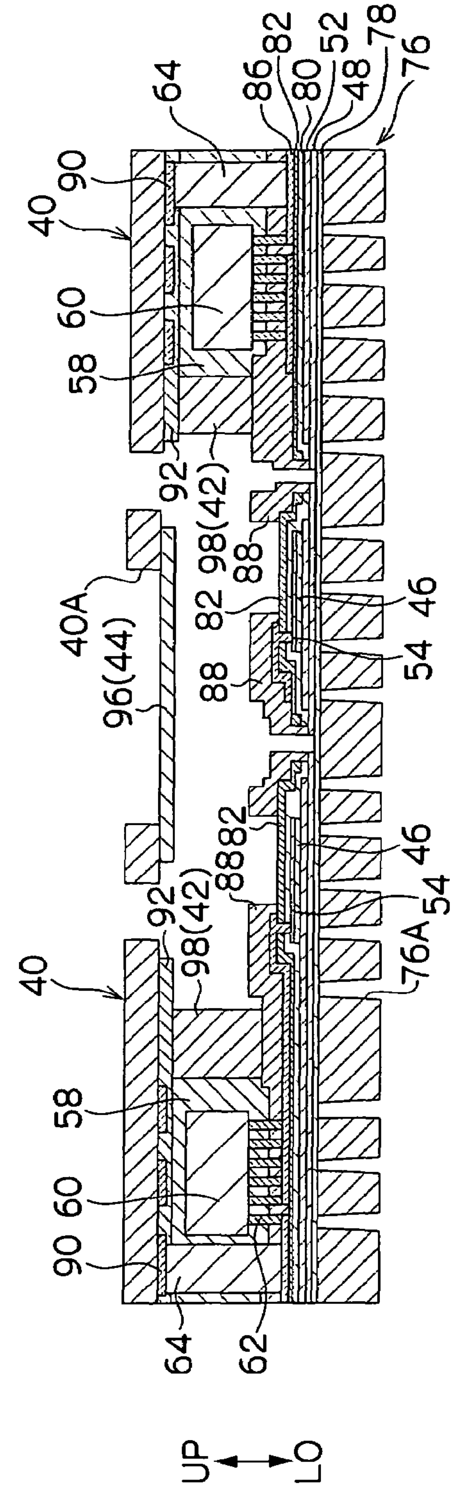

When the joining of the partition wall 42 and the bumps 64 ends, as shown in FIG. 10B, the sealing-use resin material 58 (e.g., epoxy resin) is injected in the drive ICs 60. Namely, the resin material 58 flows in through the injection ports 40B (see FIG. 5) disposed in the top plate 40. When the resin material 58 is injected and the drive ICs 60 are sealed in this manner, the drive ICs 60 can be protected from the elements of the outside environment such as moisture, and the adhesion strength between the piezoelectric element substrate 70 and the top plate 40 can be improved. Moreover, damage in a later step, such as damage resulting from water or grinded pieces when the finished piezoelectric element substrate 70 is divided by dicing it into the inkjet recording heads 32, can be avoided.

Figure 10C:
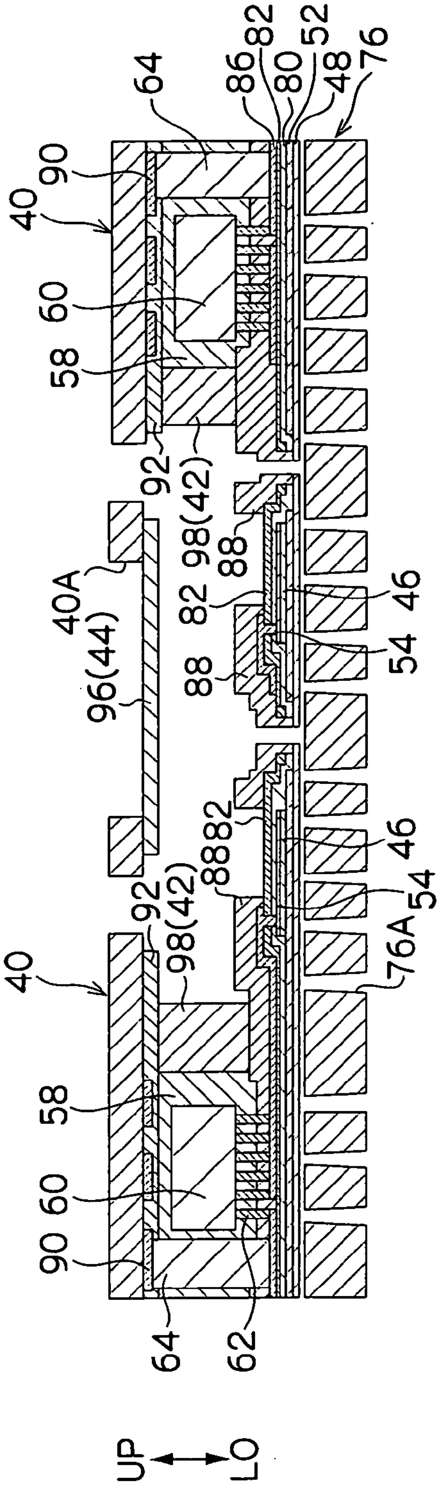

Next, as shown in FIG. 10C, the first support substrate 76 is separated from the piezoelectric element substrate 70 by injecting hydrogen peroxide ($H_2O_2$) serving as a separation solution through the through holes 76A (injection ports) in the first support substrate 76 and selectively dissolving the Ge film 78 serving as the boundary separation layer. The temperature of the hydrogen peroxide ($H_2O_2$) in this case is about 80° C., and etching (separation) at a high speed (about 20 minutes) is possible. In other words, the separation time can be shortened, and productivity can be improved.

Figure 10D:
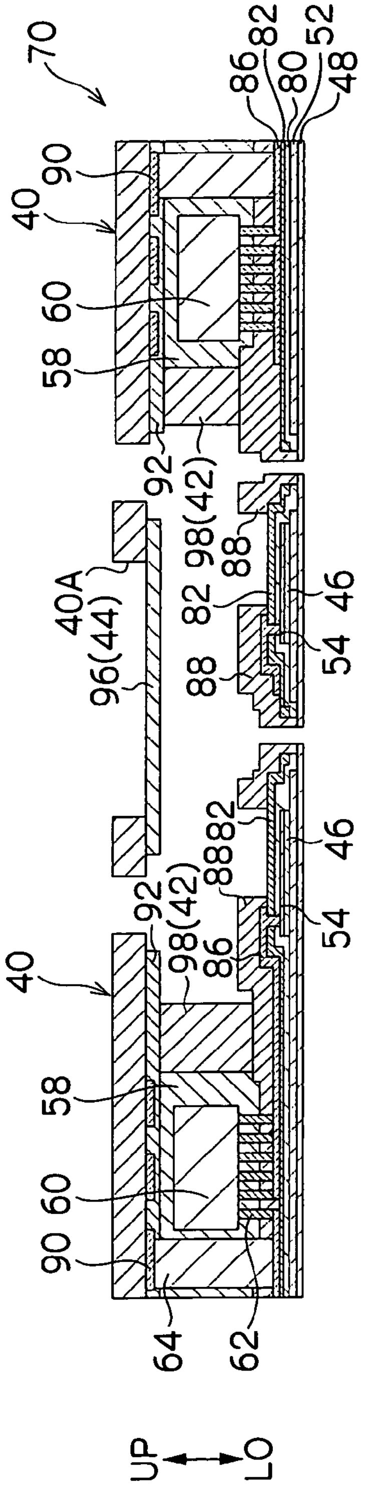

Also, because oxygen peroxide ($H_2O_2$) is used as the separation solution, other configural members of the recording head (mainly resin materials and glass) are not dissolved or separated. Thus, as shown in FIG. 10D, the piezoelectric element substrate 70 to which the top plate 40 has been bonded (joined) is completed. Then, from this state, the top plate 40 serves as the support for the piezoelectric element substrate 70.

In the present embodiment, the Ge film and the $H_2O_2$ solution were selected as the combination of the boundary separation layer and the separation solvent, but the boundary separation layer and the separation solvent are not limited to this combination and may be appropriately selected to match the configural members of the inkjet recording head 32. Other examples include a Ti film and an HCl solution, a Ni film and an $HNO_3$ solution, a Cr film and an HCl solution, and a Co film and an $H_2SO_4$ solution. However, the combination of the Ge film and the $H_2O_2$ solution is the most preferable.

Figures 11A, 11B, 11C, 11D, 11E:
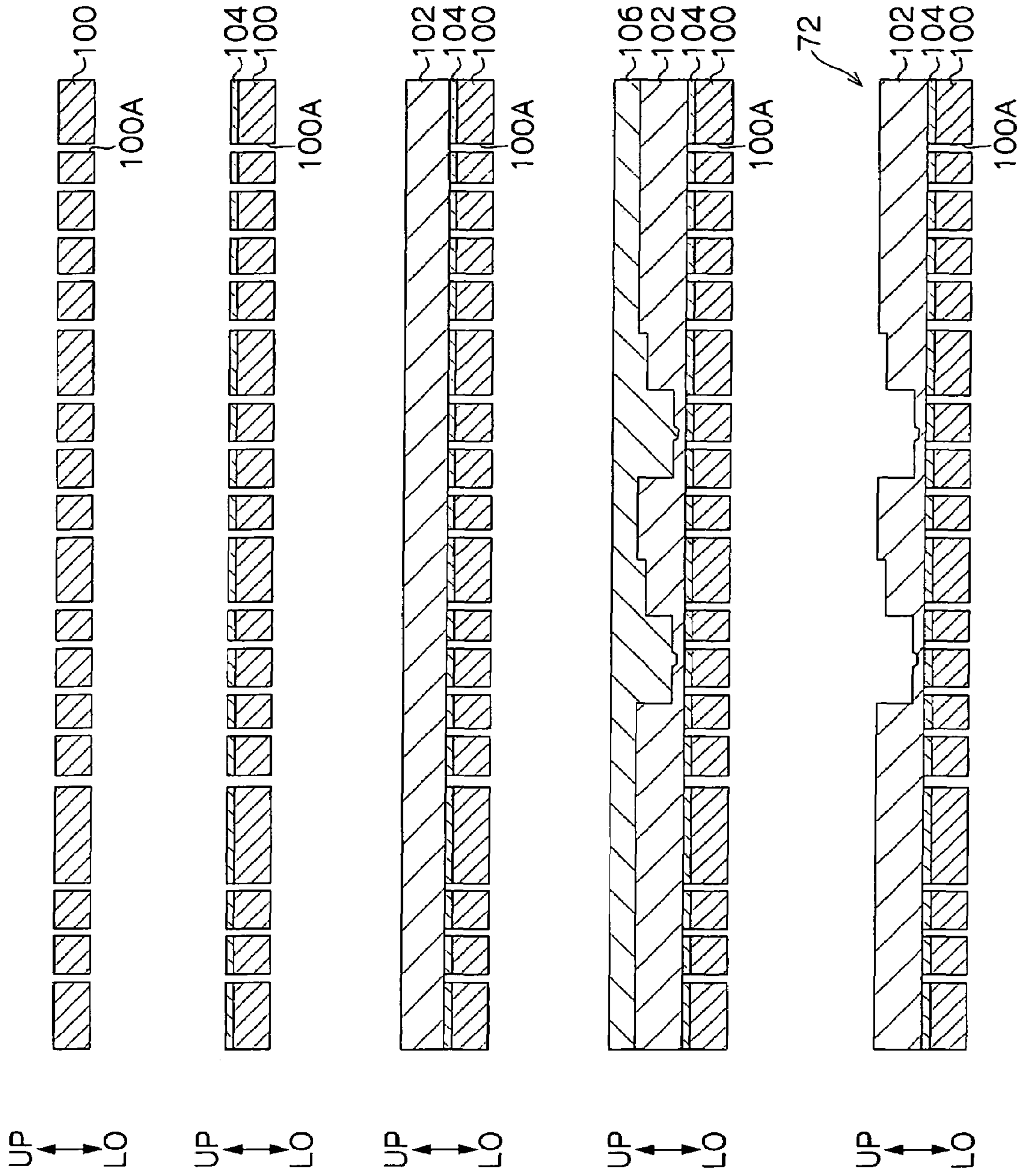
FIGS. 11A to 11E are explanatory diagrams showing the process of manufacturing a flow path substrate of the inkjet recording head of FIG. 1.

With respect to the flow path substrate 72, as shown in FIG. 11A, first, a second support substrate 100 is prepared which is made of glass and in which plural through holes 100A are disposed. Similar to the first support substrate 76, the second support substrate 100 may be made of any material that does not bend, and is not limited to glass. However, glass is preferable because it is hard and inexpensive. Known examples of the method of making the second support substrate 100 include blasting or femtosecond laser processing a glass substrate, and exposing and developing a photosensitive glass substrate (e.g., PEG3C, manufactured by HOYA Corporation).

Then, as shown in FIG. 11B, an adhesive 104 is applied to the upper surface of the second support substrate 100, and as shown in FIG. 11C, a resin substrate 102 (e.g., an amideimide substrate with a thickness of 0.1 mm to 0.5 mm) is adhered to the surface of the adhesive 104. Next, as shown in FIG. 11D, the upper surface of the resin substrate 102 is pressed against a mold 106 and heated and pressurized. Thereafter, as shown in FIG. 11E, the mold 106 is removed from the resin substrate 102, whereby the flow path substrate 72 in which the pressure chambers 50 and the nozzles 56 are formed is completed.

Figure 12A:
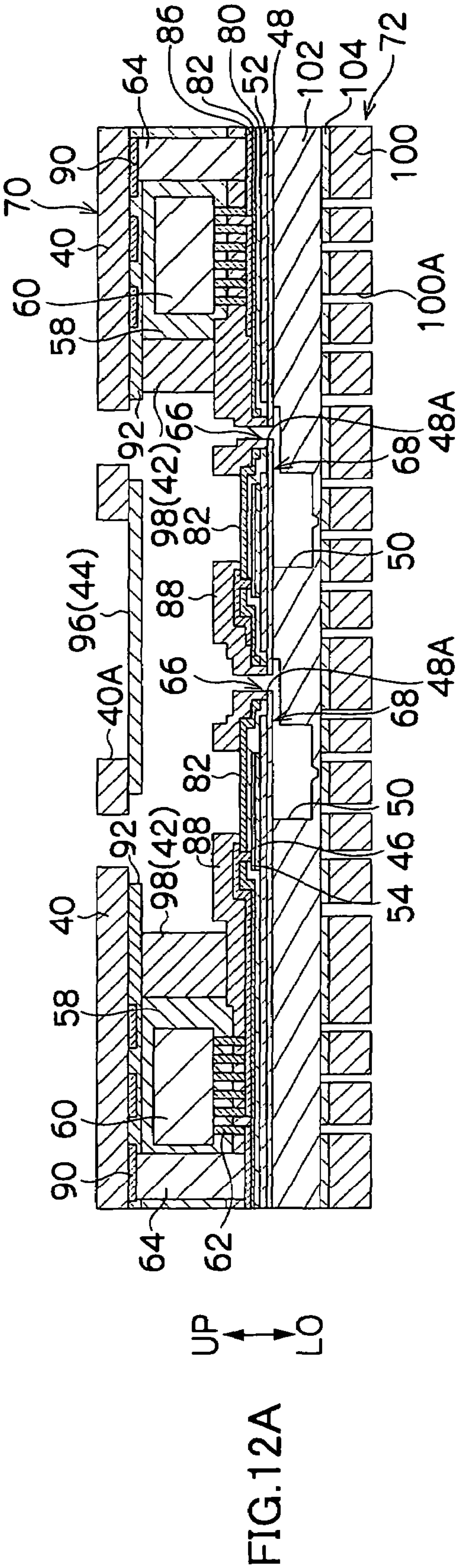
FIGS. 12A to 12E are explanatory diagrams showing the process of joining the flow path substrate of FIG. 11E to the piezoelectric element substrate of FIG. 10D.
Figure 12B:
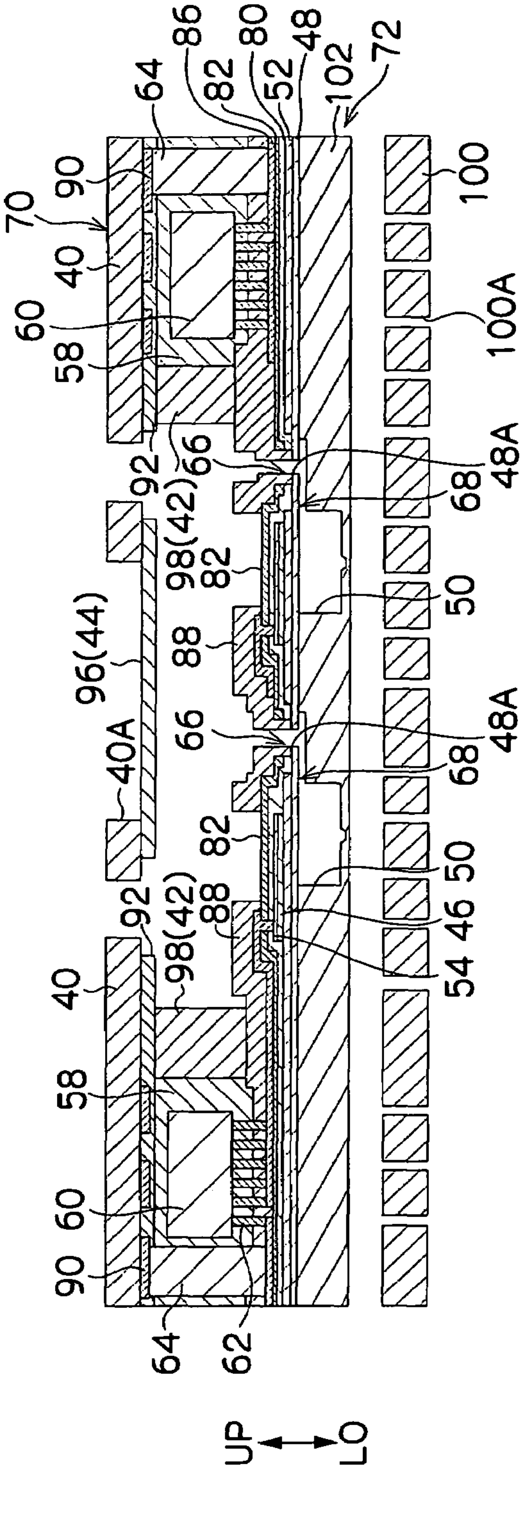

When the flow path substrate 72 is completed in this manner, as shown in FIG. 12A, the piezoelectric element substrate 70 and the flow path substrate 72 are bonded (joined) together by thermocompression. Next, as shown in FIG. 12B, the second support substrate 100 is separated from the flow path substrate 72 by injecting an adhesive separation solution through the through holes 100A in the second support substrate 100 and selectively dissolving the adhesive 104.

Figures 12C, 12D, 12E:
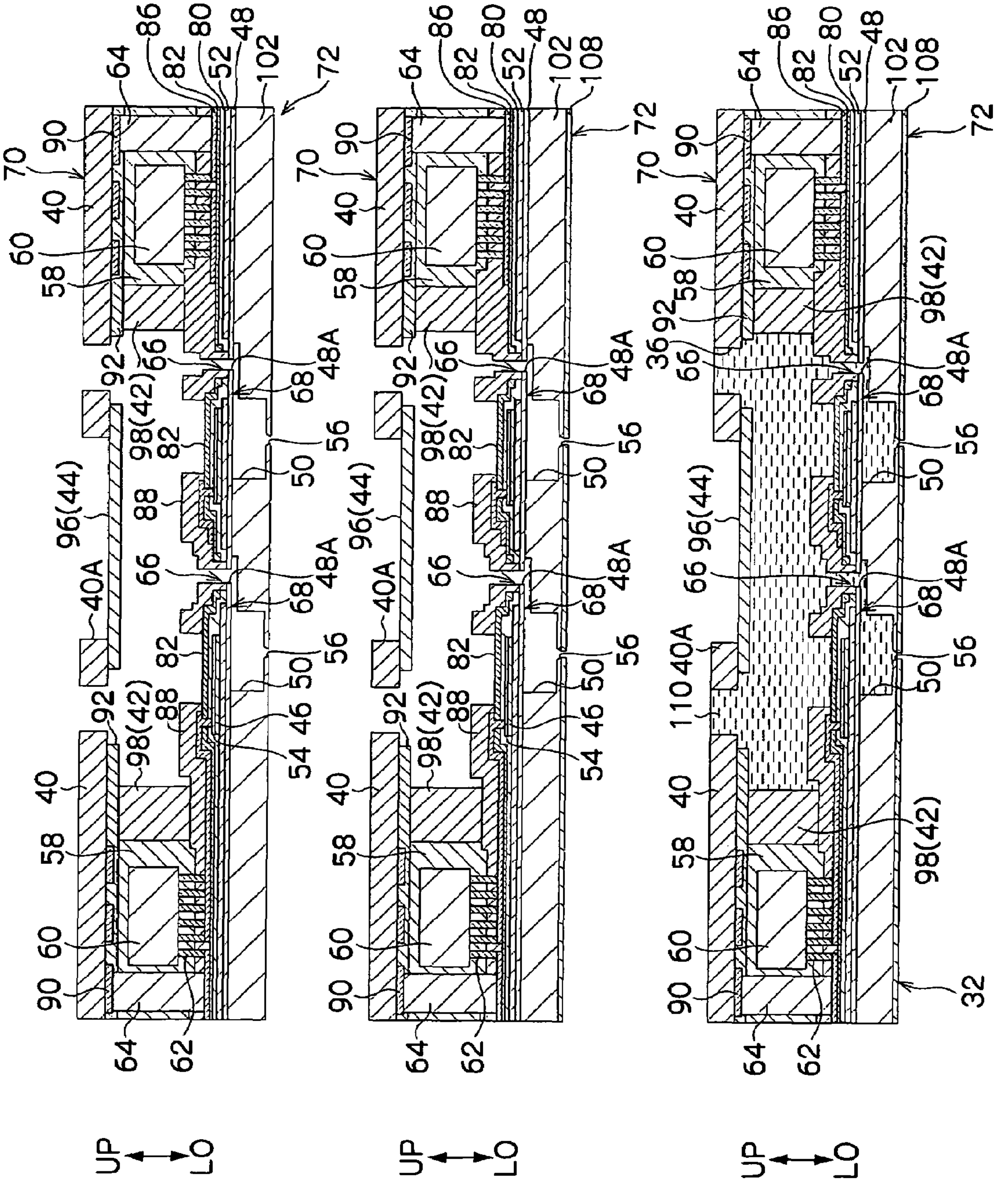

Thereafter, as shown in FIG. 12C, the surface from which the second support substrate 100 has been separated is polished using a polishing agent whose main component is alumina or reactive ion-etched using oxygen plasma, whereby the surface layer is removed and the nozzles 56 are opened. Then, as shown in FIG. 12D, a fluorine material 108 (e.g., CYTOP manufactured by Asahi Glass) serving as a water repellent is applied to the undersurface in which the nozzles 56 are opened, whereby the inkjet recording head 32 is completed. Then, as shown in FIG. 12E, the ink pool chamber 38 and the pressure chambers 50 can be filled with the ink 110.

Figure 13A:
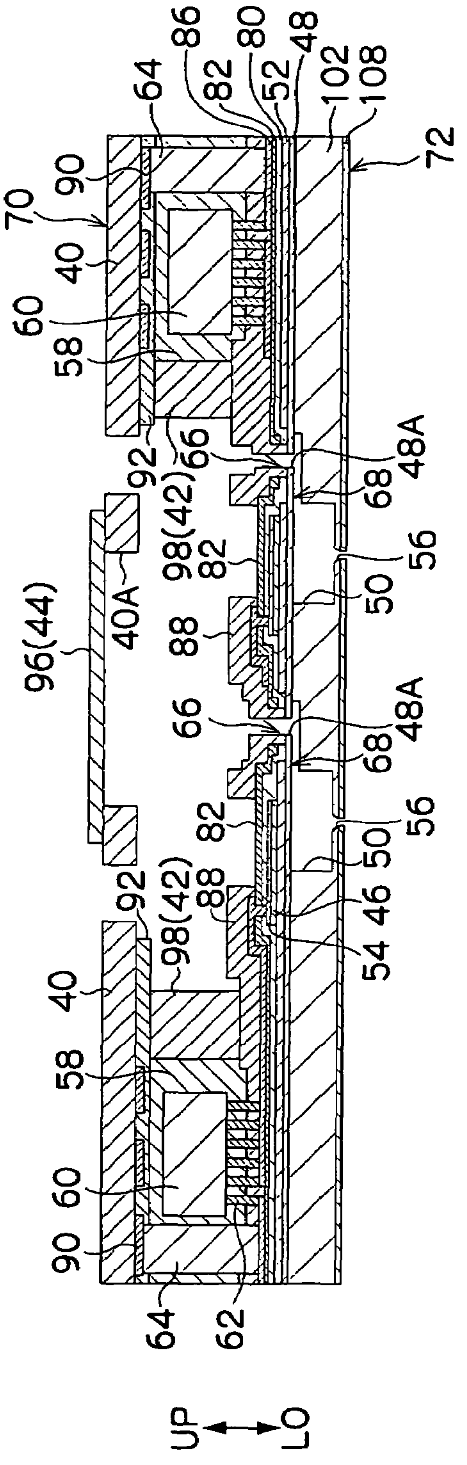
FIGS. 13A and 13B are explanatory diagrams showing inkjet recording heads pertaining to the embodiment of the invention in which the disposition of an air damper is different.
Figure 13B:
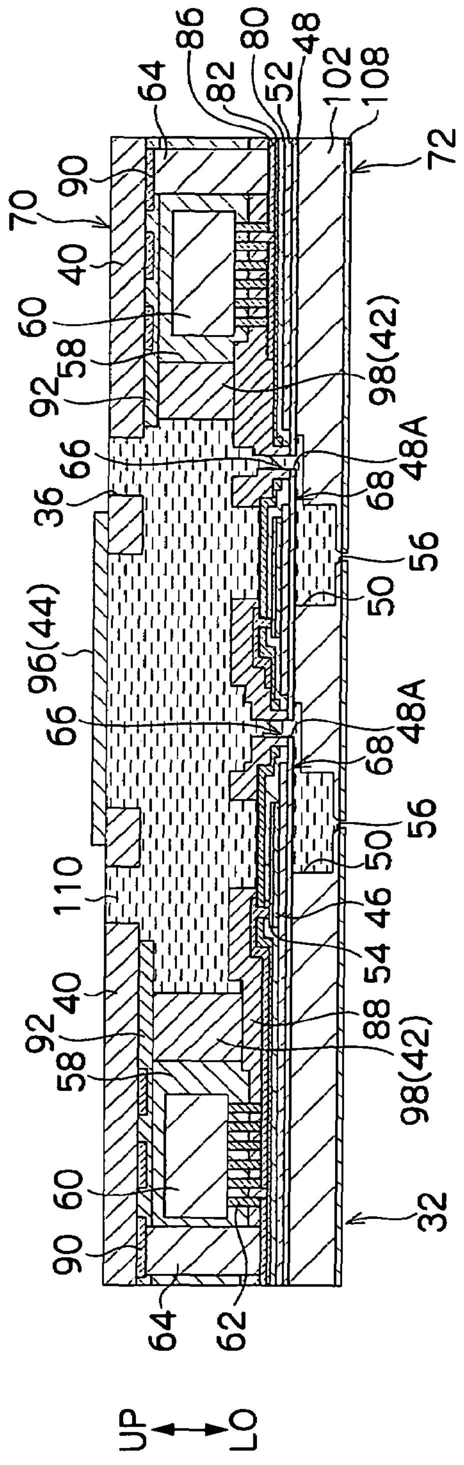

It will be noted that the photosensitive dry film 96 (air damper 44) is not limited to being disposed inside the ink pool chamber 38 at the inner side of the top plate 40. For example, as shown in FIGS. 13A and 13B, the photosensitive dry film 96 (air damper 44) may also be disposed at the outer side of the top plate 40. Namely, the photosensitive dry film 96 (air damper 44) may be adhered to the top plate 40 from the outer side of the ink pool chamber 38 immediately before the step of filling the ink pool chamber 38 with the ink 110.

Next, an embodiment will be described in a case where the through holes 76A are initially disposed in the first support substrate 76. In this case, as shown in FIG. 14, first, the first support substrate 76 is prepared which is made of glass an in which the plural through holes 76A have been disposed. The material and method of making the first support substrate 76 are the same as those described above.

Figures 14A, 14B, 14C, 14D, 14E, 14F:
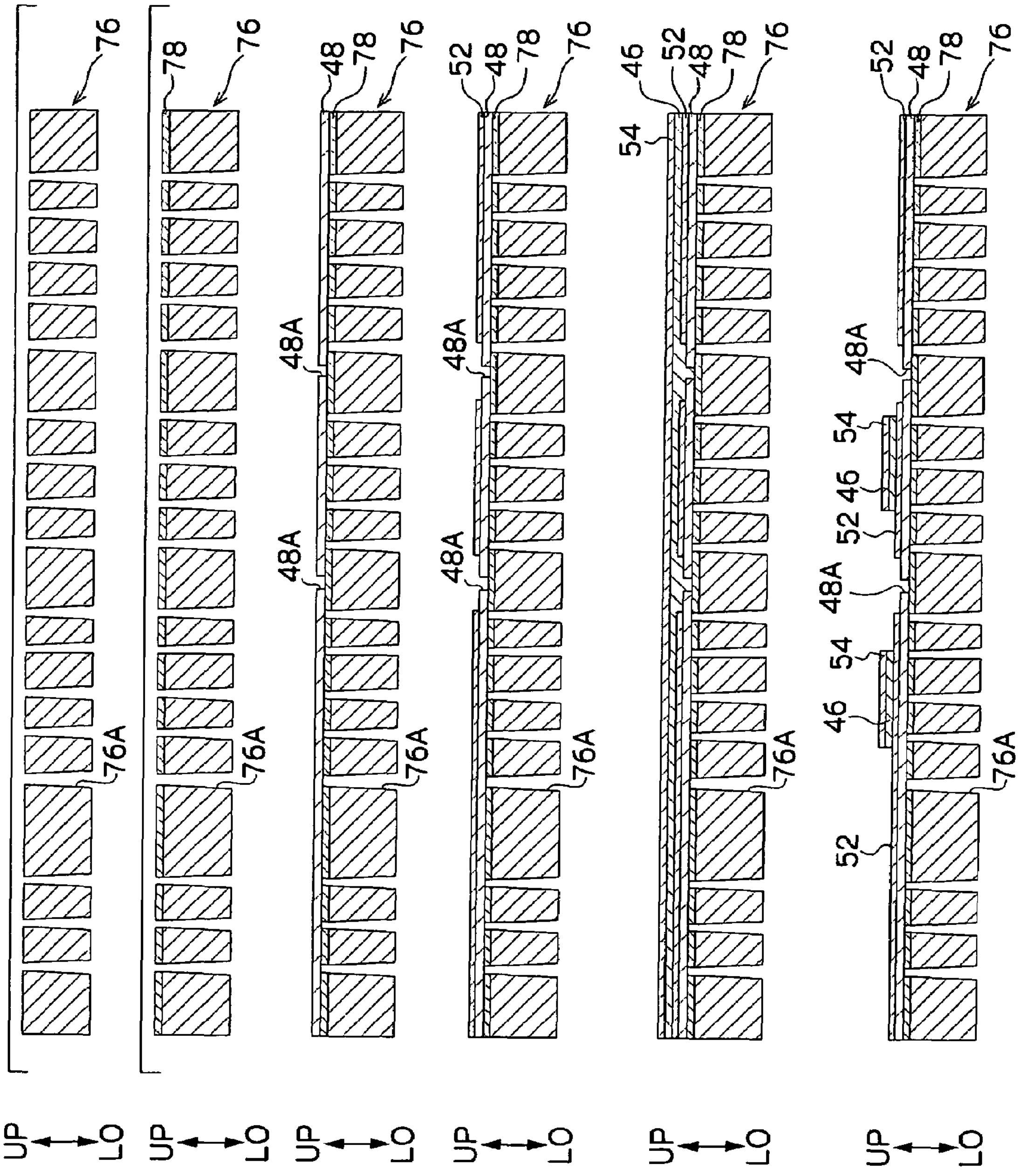
FIGS. 14A to 14J are explanatory diagrams showing another process of manufacturing the piezoelectric element substrate of the inkjet recording head pertaining to the embodiment of the invention.

Then, as shown in FIG. 14B, the Ge film (thickness: 1 μm) 78 is sputtered and formed on the upper surface of the first support substrate 76. It will be noted that, similar to that which was described above, the Ge film 78 may be formed using vapor deposition or CVD. Then, as shown in FIG. 14C, the diaphragm 48 made of metal (such as SUS) is joined to the upper surface of the first support substrate 76 using the Ge film 78.

Similar to that which was described above, the joining temperature in this case is 800° C. to 1000° C. For example, the joining temperature may be 850° C. and the adhesion time may be 10 minutes. It will be noted that when the through holes 76A are initially disposed in the first support substrate 76, the method of manufacture in this case simply comprises joining because it is difficult to form the thin film (SiOx film) serving as the diaphragm 48 on the Ge film 78.

Next, as shown in FIG. 14D, the lower electrode 52 laminated on the upper surface of the diaphragm 48 is patterned. Specifically, this is done by sputtering a metal film (film thickness: 500 Å to 3000 Å), forming a resist using photolithography, patterning (etching) the metal film, and then removing the resist using oxygen plasma. The lower electrode 52 has a ground potential.

Then, as shown in FIG. 14E, a PZT film that is the material of the piezoelectric element 46 and the upper electrode 54 are laminated in order by sputtering them on the upper surface of the lower electrode 52, and as shown in FIG. 14F, the piezoelectric element 46 (PZT film) and the upper electrode 54 are patterned.

Specifically, this is done by sputtering a PZT film (film thickness: 3 μm to 15 μm), sputtering a metal film (film thickness: 500 Å to 3000 Å), forming a resist using photolithography, patterning (etching) the PZT film and the metal film, and then removing the resist using oxygen plasma. Examples of the material for the lower and upper electrodes include Au, Ir, Ru and Pt, which have a high affinity with the PZT material that is the piezoelectric element and are heat-resistant.

Thereafter, as shown in FIG. 14C, the low water-permeable insulating film (SiOx film) 80 is deposited on the upper surfaces of the lower electrode 52 and the upper electrode 54 exposed to the upper surface, the resin film 82 (e.g., a polyimide, polyamide, epoxy, polyurethane or silicone resin film) that is ink-resistant and flexible is formed on the upper surface of the low water-permeable insulating film (SiOx film) 80, and these are patterned, whereby openings 84 (contact holes) for connecting the piezoelectric elements 46 and the metal wirings 86 are formed.

Specifically, a process is conducted where the low water-permeable insulating film (SiOx film) 80 whose dangling bond density is high is deposited using CVD, patterning is conducted by applying, exposing, and developing a photosensitive polyimide (e.g., the photosensitive polyimide DURIMIDE 7520 manufactured by FujiFilm Arch Co., Ltd.), and the SiOx film is etched using, as a mask, the photosensitive polyimide with reactive ion etching (RIE) using a $CF_4$ gas. Here, an SiOx film was used as the low water-permeable insulating film, but an SiNx film or an SiOxNy film may also be used.

Figures 14G, 14H, 14I, 14J:
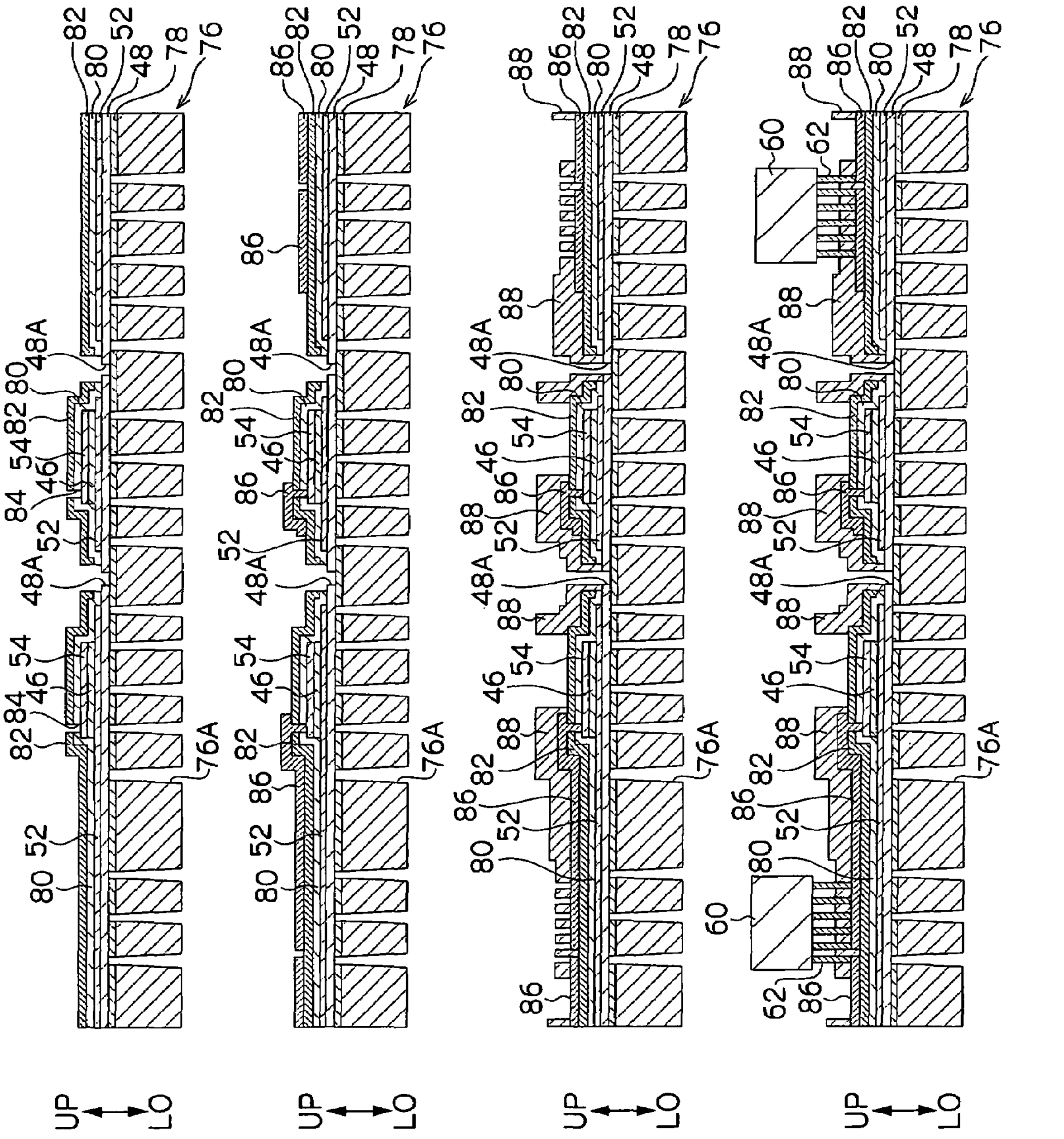
Figure 15:
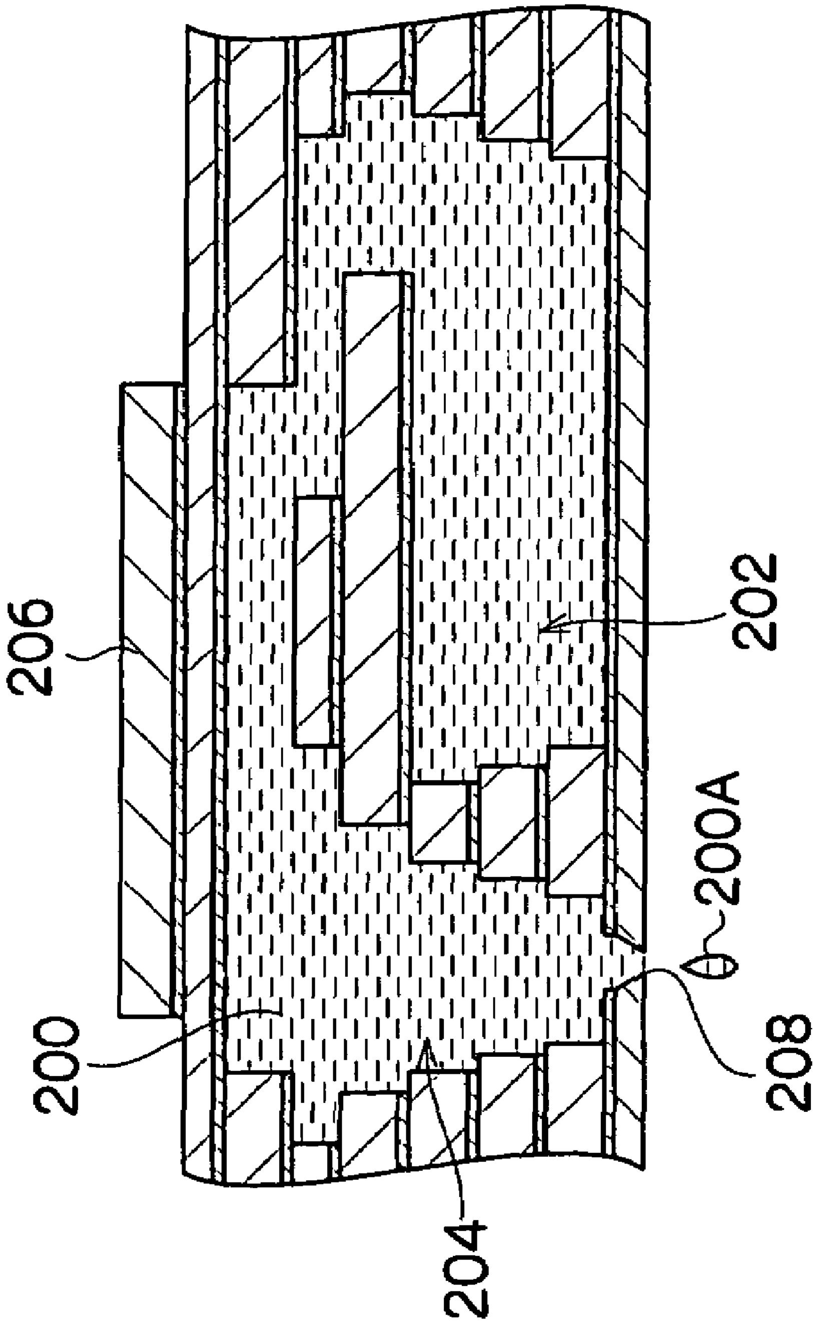
FIG.15 RELATED ART
FIG. 15 is a schematic cross-sectional view showing the structure of an inkjet recording head in the related art.
Figure 16:
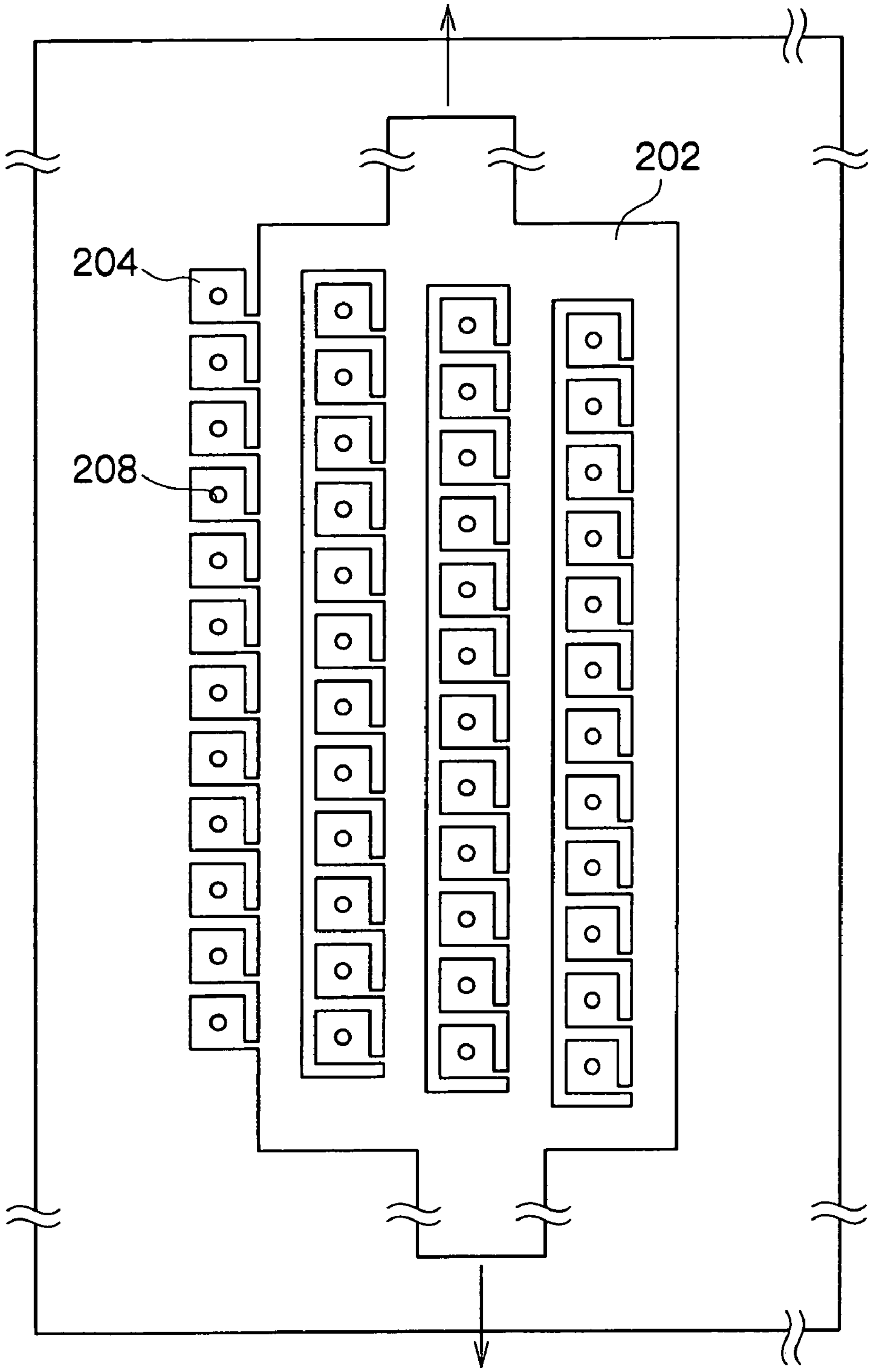
FIG.16 RELATED ART
FIG. 16 is a schematic plan view showing the structure of the inkjet recording head in the related art.
Figure 17A:
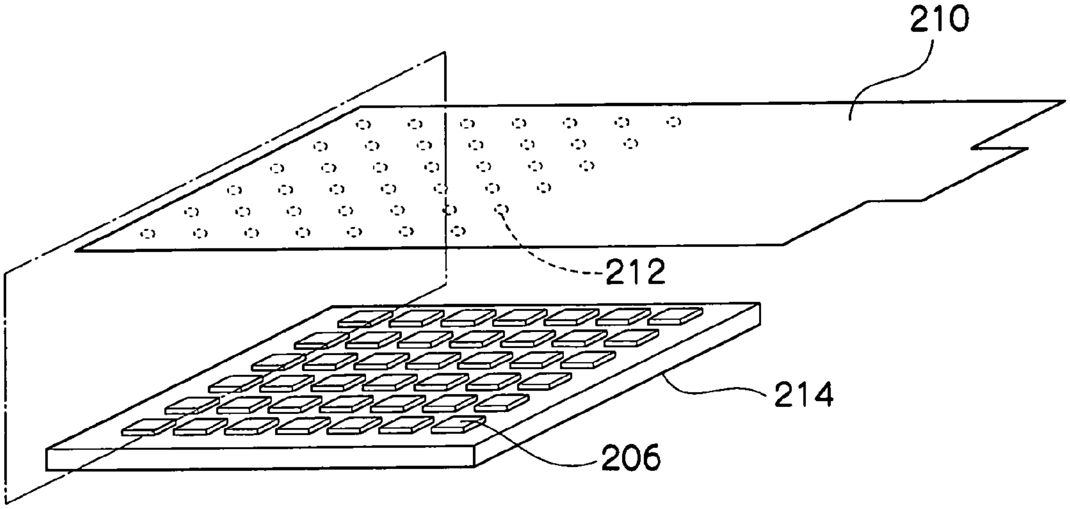
FIG.17A RELATED ART
FIGS. 17A and 17B are schematic perspective views showing the structure of the inkjet recording head in the related art.
Figure 17B:
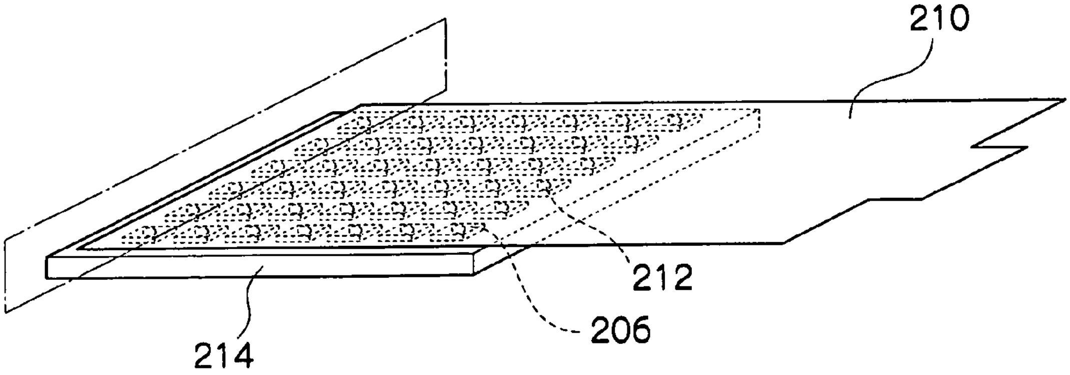
FIG.17B RELATED ART

Next, as shown in FIG. 14H, a metal film is deposited on the upper surfaces of the upper electrode 54 and the resin film 82 inside the openings 84, and the metal wirings 86 are patterned. Specifically, a process is conducted where an Al film (film thickness: 1 μm) is formed by sputtering, a resist is formed using photolithography, the Al film is etched with RIE using a chlorine gas, and the resist film is removed using oxygen plasma, and then the upper electrodes 54 and the metal wirings 86 (Al film) are joined together. Although they are not shown, the openings 84 are also disposed above the lower electrodes 52, and the lower electrodes 52 are connected to the metal wirings 86 in the same manner as the upper electrodes 54.

Then, as shown in FIG. 14I, the resin protective film 88 (e.g., the photosensitive polyimide DURIMIDE 7320 manufactured by FujiFilm Arch Co., Ltd.) is formed on the upper surfaces of the metal wirings 86 and the resin film 82 and patterned. The resin protective film 88 is configured by the same kind of resin material as the resin film 82. At this time, care is taken to ensure that the resin protective film 88 is not formed at the sites above the piezoelectric elements 46 where the metal wirings 86 are not patterned (so that only the resin film 82 is formed).

Here, the reason the resin protective film 88 is not formed above the piezoelectric elements 46 (i.e., on the upper surface of the resin film 82) is to prevent the displacement (elastic deformation in the vertical direction) of the diaphragm 48 (the piezoelectric elements 46) from being inhibited. When the metal wirings 86 pulled out from the upper electrodes 54 (connected to the upper electrodes 54) of the piezoelectric elements 46 are covered by the resin protective film 88, the joining strength of these covering the metal wirings 86 becomes strong and the metal wirings 86 can be prevented from being corroded by the ink 110 ingressing from the boundary, because the resin protective film 88 is configured by the same kind of resin material as the resin film 82 on which the metal wirings 86 are formed.

It will be noted that the joining strength with respect to the partition wall 42 (the photosensitive dry film 98) also becomes strong because the resin protective film 88 is configured by the same kind of resin material as the partition wall 42 (the photosensitive dry film 98). Thus, ingress of the ink 110 from the boundary is further prevented. Also, when the resin protective film 88 is configured by the same kind of resin material as the partition wall 42, there is the advantage that there is less heat stress because the coefficients of thermal expansion of these become substantially equivalent.

Next, as shown in FIG. 14J, the drive ICs 60 are flip-chip mounted on the metal wirings 86 via the bumps 62. At this time, the drive ICs 60 are processed to a predetermined thickness (70 μm to 300 μm) by grinding implemented at the end of a semiconductor wafer process. When the drive ICs 60 are too thick, it becomes difficult to pattern the partition wall 42 and form the bumps 64.

Electric field plating, non-electric field plating, bowl bumping, and screen printing can be applied for the method of forming the bumps 62 for flip-chip mounting the drive ICs 60 on the metal wirings 86. In this manner, similar to that which was described above, the piezoelectric element substrate 70 is manufactured, and the top plate 40 made of glass, for example, is bonded (joined) to the piezoelectric element substrate 70. Also, because the steps thereafter are the same as those which were described above, description thereof will be omitted.

Next, the action of the inkjet recording apparatus 10 disposed with the inkjet recording heads 32 manufactured in this manner will be described. First, when an electrical signal instructing printing is sent to the inkjet recording apparatus 10, the recording paper P is picked up one sheet at a time from the paper supply tray 12 by the pickup roller 13, and conveyed to the recording section 14 by the first conveyance section 16.

In the inkjet recording heads 32, because the ink 110 has already been injected (filled) from the reservoir tanks 34 into the ink pool chamber 38 via the ink supply ports 36, the ink 110 filling the ink pool chamber 38 is supplied to the pressure chambers 50 via the ink flow paths 66 and 68. Then, at this time, a meniscus, in which the surface of the ink 110 is slightly recessed towards the pressure chambers 50, is formed at the ends (discharge ports) of the nozzles 56.

Then, the inkjet recording heads 32 selectively eject ink from the plural nozzles 56, whereby an image based on image data is recorded on the recording paper P. Namely, a voltage is applied at a predetermined timing by the drive ICs 60 to predetermined piezoelectric elements 46, the diaphragm 48 is elastically deformed (is vibrated out of plane) in the vertical direction, and the ink 110 inside the pressure chambers 50 is pressurized and ejected as ink droplets through predetermined nozzles 56.

When an image based on image data has been recorded on the recording paper P in this manner, the recording paper P is conveyed by the second conveyance section 20 and discharged onto the paper exit tray 18. In the case of duplex printing, the recording paper P is inverted by the inversion section 22, again supplied to the recording section 14, and an image is recorded on the other side of the recording paper P. Thereafter, the recording paper P is conveyed by the second conveyance section 20 and discharged onto the paper exit tray 18. Thus, printing of (image recording on) the recording paper P is completed.

Here, in the inkjet recording heads 32, the ink pool chamber 38 is disposed at the opposite side (upper side) of the pressure chambers 50 with the diaphragm 48 (piezoelectric elements 46) therebetween. In other words, the diaphragm 48 (piezoelectric elements 46) is disposed between the ink pool chamber 38 and the pressure chambers 50, so that the ink pool chamber 38 and the pressure chambers 50 are not present in the same horizontal plane. Thus, the pressure chambers 50 are disposed in mutual proximity, and the nozzles 56 are arranged in a high-density matrix.

The drive ICs 60 applying the voltage to the piezoelectric elements 46 are disposed between the diaphragm 48 and the top plate 40, and configured to not be exposed (to not protrude) to the outside from the diaphragm 48 and the top plate 40. Thus, the length of the metal wirings 86 connecting the piezoelectric elements 46 to the drive ICs 60 can be shortened in comparison to a case where the drive ICs 60 are mounted on the outside of the inkjet recording head 32. Thus, low resistance of the metal wirings 86 and high-density connection are realized. In other words, high-densification of the nozzles 56 can be accommodated with a practical wiring resistance, and an increase in the resolution can be realized.

Also, because the drive ICs 60 are flip-chip mounted on the piezoelectric element substrate 70 comprising the piezoelectric elements 46 formed on the diaphragm 48, high-density wiring connection can be done easily, and the height of the drive ICs 60 can be reduced (can be thinned). Moreover, because the metal wirings 90 connected to the drive ICs 60 are formed on the top plate 40, it is not necessary to separately dispose an FPC or the like connecting to the drive ICs 60 as has conventionally been the case. Thus, the number of parts can be reduced. Therefore, the inkjet recording head 32 can be configured compactly.

Specifically, in an electrical connection resulting from a conventional FPC format, the limit on the nozzle resolution has been 600 npi (nozzle per pitch), but in the format of the present invention, a 1200 npi arrangement becomes easily possible. Also, the size is equal to or less than ½ in comparison to a nozzle arrangement of 600 npi because an FPC does not have to be used.

Also, when the first support substrate 76 and the second support substrate 100 are both made of glass, the difference between their coefficients of thermal expansion when they are heated becomes small, and they are strong with respect to bending and separation. Thus, the top plate 40 and the piezoelectric element substrate 70, and the piezoelectric element substrate 70 on which the top plate 40 has been joined and the flow path substrate 72, can be suitably thermocompressed. Moreover, because the peripheries of the drive ICs 60 are sealed with the resin material 58, the joining strength of the top plate 40 and the piezoelectric element substrate 70 becomes stronger. Additionally, because the drive ICs 60 are sealed with the resin material 58, the drive ICs 60 can be protected from the elements of the outside environment such as moisture.

Also, as described above, because the first support substrate 76 and the diaphragm 48 are adhered together so that the through holes 76A and 48A do not overlap, various materials used during each step are prevented from leaking from the undersurface of the first support substrate 76 through the through holes 48A and 76A. Also, because the air damper 44 is disposed at the top plate 40, the size and position of the air damper 44 can be freely changed. In other words, there is the effect that the air damper 44 can be easily optimized.

Also, when the first support substrate 76 and the diaphragm are to be joined together, the adhesive is made to serve as the Ge film 78 doubling as the separation layer. Thus, the manufacturing process can be simplified when the first support substrate 76 and the diaphragm 48 are joined together. Also, because the Ge film is heat-resistant up to 1000° C., the joining temperature can be 800° C. to 1000° C., and there is the advantage that restrictions do not have to be placed on the heating temperature with respect to the first support substrate 76 on which the piezoelectric elements 46 are formed.

It will be noted that when the through holes 76A in the first support substrate 76 are initially made to serve as the non-through holes 76B, the thin film (e.g., SiOx film) that becomes the diaphragm 48 can be formed by CVD or the like on the Ge film 78. Thus, the first support substrate 76 can be manufactured more quickly than when the diaphragm 48 is joined to the Ge film 78. This is also more suited to film-thinning in comparison to adhering the diaphragm 48 to the Ge film 78.

Namely, when the diaphragm 48 is made of a thin plate of glass, for example, it is thinned by being polished after the diaphragm 48 is adhered to the first support substrate 76. Thus, although the variations become large, there are few pinholes when a thin film (SiOx film) is formed as described above, a thickness of 10 μm or less can also be accommodated, and the evenness of the film thickness is good. Moreover, because the step of joining the diaphragm 48 is omitted, the entire manufacturing process can be simplified. Also, because the diaphragm 48 does not have to be exposed to high-temperature heating, a material with low heat resistance can also be used, and there are more options for the material that can be used for the diaphragm 48.

Also, because the Ge film 78 serving as the boundary separation layer can be dissolved (etched) at a high speed with hydrogen peroxide ($H_2O_2$) of about 80° C., the separation time is short. Thus, productivity can be raised. Also, because hydrogen peroxide ($H_2O_2$) is used as the separation solution, drawbacks such as other configural members of the recording head (mainly resin materials and glass) being dissolved or separated do not arise.

Also, because the through holes 76A in the first support substrate 76 into which the hydrogen peroxide ($H_2O_2$) is injected are disposed in a tapered manner so that their cross section (open hole area) becomes smaller from the side of the injection ports into which the hydrogen peroxide ($H_2O_2$) is injected to the diaphragm 48 side (from below to above), the supply of the hydrogen peroxide ($H_2O_2$) to the Ge film layer boundary can be excellently maintained.

In any event, the piezoelectric element substrate 70 and the flow path substrate 72 configuring the inkjet recording head 32 are manufactured on the always-strong support substrates 76 and 100, and in the manufacturing process of these, a manufacturing method is used where the support substrates 76 and 100 can be removed at the point in time when they become unnecessary. Thus, the piezoelectric element substrate 70 and the flow path substrate 72 can be manufactured extremely easily.

Also, because the manufactured (completed) inkjet recording head 32 is supported by the top plate 40, its rigidity is ensured. Also, because the support substrates 76 and 100 in which the through holes 76A and 100A are already disposed can be repeatedly used, this is preferable in terms of cost. In this manner, the manufacturing method pertaining to the present invention is optimum for manufacturing the inkjet recording head 32 (liquid droplet ejection head) whose resolution is raised and which is compact.

In addition, the inkjet recording head 32 (liquid droplet ejection head) pertaining to the embodiment of the invention is effective for realizing a high-density nozzle arrangement. Thus, in the preceding embodiment, the invention was described using the example of the inkjet recording apparatus 10 disposed with the FWA inkjet recording head 32 corresponding to the paper width for which single-pass printing is necessary. However, the inkjet recording apparatus 10 (liquid droplet ejection apparatus) pertaining to the invention is not limited to this.

For example, the invention can also be applied to a partial width array (PWA) inkjet recording apparatus where inkjet recording heads 32 of the respective colors of yellow (Y), magenta (M), cyan (C) and black (K) are mounted in a carriage (not shown), ink droplets are selectively ejected from the inkjet recording heads 32 of these respective colors on the basis of image data, and a full-color image is recorded on the recording paper P.

Also, the image recording by the liquid droplet ejection head pertaining to the invention is not limited to recording an image (including characters) on the recording paper P. Namely, the recording medium is not limited to the recording paper P, and the liquid that is ejected is not limited to ink. For example, the liquid droplet ejection head pertaining to the invention can also be applied to general liquid droplet ejection apparatus used in various industries, such as liquid droplet ejection apparatus that create color filters for displays by ejecting ink onto a polymer film or glass, or which form bumps for mounting parts by discharging molten solder onto a substrate.

As described above, according to the liquid droplet ejection head manufacturing method pertaining to the embodiment of the invention, the through holes in the support substrate and the holes for forming the flow paths in the diaphragm do not overlap. Thus, various kinds of materials used in each step can be prevented from leaking from the undersurface of the support substrate through the through holes and the holes for forming the flow paths.

Also, the supply of the solvent (separation solution) to the separation boundary can be excellently maintained.

Moreover, because the diaphragm is formed on the boundary separation layer (germanium film), the step of joining the diaphragm can be omitted. Thus, the manufacturing process can be simplified. Also, the evenness of the film thickness is better than the case where the diaphragm is joined.

Moreover, the diaphragm can be prevented from being etched.

Also, because the germanium film (Ge film) functions as the separation layer doubling as an adhesive, the manufacturing process can be simplified when the support substrates and the diaphragm are joined together. Moreover, because the support substrates can be reused, this is preferable in terms of cost.

Moreover, because the germanium film (Ge film) is heat resistant up to 1000° C., restrictions do not have to be placed on the heating temperature with respect to the support substrate when forming the piezoelectric element and on the temperature for crystallization annealing thereafter (e.g., 650° C.). In other words, if a resin adhesive is used, there is the drawback that a heating temperature of 650° C. cannot be accommodated.

Moreover, because the germanium film (Ge film) can be dissolved (etched) at a high speed with hydrogen peroxide ($H_2O_2$) of about 80° C., the separation time is short. Thus, productivity can be raised. Also, because hydrogen peroxide ($H_2O_2$) is used as the adhesive separation solution, drawbacks such as other configural members of the recording head (mainly resin materials and glass) being dissolved or separated do not arise. For example, sometimes hydrofluoric acid is used to separate a glass adhesive, but there are the drawbacks that the etching rate is slow and other members are corroded.

Also, because the support substrates are made of glass, the difference between their coefficients of thermal expansion when they are heated becomes small, and they are strong with respect to bending and separation. Thus, the top plate and the piezoelectric element substrate, and the piezoelectric element substrate and the flow path substrate, can be suitably thermo-compressed.

Also, a liquid droplet ejection head manufactured by the liquid droplet ejection head manufacturing method pertaining to the embodiment of the invention and a liquid droplet ejection apparatus disposed with this liquid droplet ejection head can realize high resolution because they can realize high-densification of the nozzles. The liquid droplet ejection head can also be configured compactly.

According to the embodiment of the invention described above, because the ink pool chamber can be formed at the side opposite from the side where the pressure chambers and the nozzles are, with the diaphragm being disposed between the ink pool chamber and the pressure chambers, the nozzles can be arranged in a high density. The invention is also effective for forming a thin diaphragm, which is demanded of a high-resolution liquid droplet ejection head. Thus, a method of manufacturing a liquid droplet ejection head in which the resolution is raised and which can be configured compactly, a liquid droplet ejection head manufactured by this method, and a liquid droplet ejection apparatus disposed with this liquid droplet ejection head can be provided.

What is claimed is:

1. A method of manufacturing a liquid droplet ejection head including nozzles that eject liquid droplets, pressure chambers that are communicated with the nozzles and filled with a liquid, a diaphragm that configures part of the pressure chambers, a pool chamber that pools the liquid supplied to the pressure chambers via flow paths, and piezoelectric elements that cause the diaphragm to be displaced, the method comprising:

disposing the diaphragm on a support substrate;

disposing plural non-through holes in an undersurface of the support substrate;

forming a boundary separation layer on an upper surface of the support substrate, the diaphragm being formed on the boundary separation layer, and patterning the undersurface of the support substrate to make the non-through holes into through holes;

disposing the through holes in a tapered manner so that their cross-sectional area is reduced from an injection port side for injecting a solvent towards the diaphragm side;

disposing the piezoelectric elements on the diaphragm;

disposing a top plate including wirings on the diaphragm; and removing the support substrate from the diaphragm to form a piezoelectric element substrate and joining a flow path substrate, in which the pressure chambers are formed, to the piezoelectric element substrate.

2. The liquid droplet ejection head manufacturing method of claim 1, wherein the pool chamber is disposed at the opposite side of the pressure chambers, with the diaphragm being disposed between the pool chamber and the pressure chambers.

3. The liquid droplet ejection head manufacturing method of claim 1, wherein the support substrate includes through holes that penetrate the thickness direction of the support substrate.

4. The liquid droplet ejection head manufacturing method of claim 3, wherein the diaphragm is disposed on the support substrate via a boundary separation layer, and the boundary separation layer is dissolved by injecting a solvent through the through holes in the support substrate, whereby the support substrate is removed from the diaphragm.

5. The liquid droplet ejection head manufacturing method of claim 3, wherein the through holes in the support substrate are disposed at places different from holes disposed in the diaphragm that are for forming flow paths.

6. The liquid droplet ejection head manufacturing method of claim 3, wherein the through holes are disposed in a tapered manner so that their cross-sectional area is reduced from an injection port side for injecting a solvent towards the diaphragm side.

7. The liquid droplet ejection head manufacturing method of claim 3, wherein the boundary separation layer comprises a germanium film.

8. The liquid droplet ejection head manufacturing method of claim 3, wherein the diaphragm side is covered by a protective film.

9. The liquid droplet ejection head manufacturing method of claim 1, wherein plural through holes are disposed in the support substrate, a germanium film is formed on the support substrate, and the diaphragm is disposed on the germanium film.

10. The liquid droplet ejection head manufacturing method of claim 9, wherein the joining temperature of the diaphragm by the germanium film is 800° C. to 1000° C.

11. The liquid droplet ejection head manufacturing method of claim 7, wherein the germanium film is separated by injecting hydrogen peroxide through the through holes in the support substrate.

12. The liquid droplet ejection head manufacturing method of claim 1, wherein the piezoelectric element substrate and the flow path substrate are joined together by thermocompression.

13. The liquid droplet ejection head manufacturing method of claim 1, wherein the support substrate comprises glass.

14. The liquid droplet ejection head manufacturing method of claim 1, wherein the flow path substrate is formed by disposing a resin substrate on a second support substrate including plural through holes, pressing a mold into the resin substrate and heating and pressurizing the resin substrate, and removing the mold from the resin substrate.

15. The liquid droplet ejection head manufacturing method of claim 14, wherein the second support substrate is separated from the flow path substrate after the flow path substrate and the piezoelectric element substrate have been joined together.

16. A liquid droplet ejection head including nozzles that eject liquid droplets, pressure chambers that are communicated with the nozzles and filled with a liquid, a diaphragm that configures part of the pressure chambers, a pool chamber that pools the liquid supplied to the pressure chambers via flow paths, and piezoelectric elements that cause the diaphragm to be displaced manufactured by the steps of:

disposing the diaphragm on a support substrate;

disposing plural non-through holes in an undersurface of the support substrate;

forming a boundary separation layer on an upper surface of the support substrate, the diaphragm being formed on the boundary separation layer, and patterning the undersurface of the support substrate to make the non-through holes into through holes;

disposing the through holes in a tapered manner so that their cross-sectional area is reduced from an injection port side for injecting a solvent towards the diaphragm side;

disposing the piezoelectric elements on the diaphragm;

disposing a top plate including wirings on the diaphragm; and removing the support substrate from the diaphragm to form a piezoelectric element substrate and joining a flow path substrate, in which the pressure chambers are formed, to the piezoelectric element substrate.

17. A liquid droplet ejection apparatus head disposed with a liquid droplet ejection head including nozzles that eject liquid droplets, pressure chambers that are communicated with the nozzles and filled with a liquid, a diaphragm that configures part of the pressure chambers, a pool chamber that pools the liquid supplied to the pressure chambers via flow paths, and piezoelectric elements that cause the diaphragm to be displaced manufactured by the steps of:

disposing the diaphragm on a support substrate;

disposing plural non-through holes in an undersurface of the support substrate;

forming a boundary separation layer on an upper surface of the support substrate, the diaphragm being formed on the boundary separation layer, and patterning the undersurface of the support substrate to make the non-though holes into through holes;

disposing the through holes in a tapered manner so that their cross-sectional area is reduced from an injection port side for injecting a solvent towards the diaphragm side;

disposing the piezoelectric elements on the diaphragm;

disposing a top plate including wirings on the diaphragm; and removing the support substrate from the diaphragm to form a piezoelectric element substrate and joining a flow path substrate, in which the pressure chambers are formed, to the piezoelectric element substrate.

* * * * *